US008192277B2

(12) United States Patent
Soltys et al.

(10) Patent No.: US 8,192,277 B2
(45) Date of Patent: Jun. 5, 2012

(54) SYSTEMS, METHODS AND ARTICLES TO ENHANCE PLAY AT GAMING TABLES WITH BONUSES

(75) Inventors: Richard Soltys, Mercer Island, WA (US); Richard Huizinga, Mercer Island, WA (US)

(73) Assignee: Bally Gaming, Inc., Las Vegas, NV (US)

(*) Notice: Subject to any disclaimer, the term of this patent is extended or adjusted under 35 U.S.C. 154(b) by 1058 days.

(21) Appl. No.: 11/893,995

(22) Filed: Aug. 17, 2007

(65) Prior Publication Data

US 2008/0113781 A1 May 15, 2008

Related U.S. Application Data

(60) Provisional application No. 60/838,280, filed on Aug. 17, 2006.

(51) Int. Cl.
*A63F 9/24* (2006.01)
*A63F 13/00* (2006.01)

(52) U.S. Cl. ................. 463/25; 463/12; 463/13; 463/30

(58) Field of Classification Search .................... 463/25, 463/29
See application file for complete search history.

(56) References Cited

U.S. PATENT DOCUMENTS

| | | | | |
|---|---|---|---|---|
| 3,751,041 | A | 8/1973 | Seifert | 273/149 P |
| 3,766,452 | A | 10/1973 | Burpee et al. | 317/262 R |
| 3,814,436 | A | 6/1974 | Boren | 273/149 P |
| 4,023,167 | A | 5/1977 | Wahlstrom | 343/6.5 SS |
| 4,026,309 | A | 5/1977 | Howard | 133/8 R |
| 4,031,376 | A | 6/1977 | Corkin, Jr. | 235/156 |
| 4,108,361 | A | 8/1978 | Krause | 235/375 |
| 4,135,663 | A | 1/1979 | Nojiri et al. | 235/463 |
| 4,373,726 | A | 2/1983 | Churchill et al. | 273/138 A |
| 4,531,117 | A | 7/1985 | Nourse et al. | 340/572 |
| 4,531,187 | A | 7/1985 | Uhland | 364/412 |
| 4,531,909 | A | 7/1985 | Takeshita | 432/37 |
| 4,534,562 | A | 8/1985 | Cuff et al. | 273/149 P |
| 4,636,846 | A | 1/1987 | Villarreal | 358/100 |
| 4,662,637 | A | 5/1987 | Pfeiffer | 273/149 P |
| 4,667,959 | A | 5/1987 | Pfeiffer et al. | 273/149 R |
| 4,693,480 | A | 9/1987 | Smith | 273/296 |

(Continued)

FOREIGN PATENT DOCUMENTS

DE 3807127 A1 9/1989

(Continued)

OTHER PUBLICATIONS

"Probability" definition from Merriam-Webster's Dictionary, from http://www.m-w.com. Accessed Sep. 6, 2011.*

(Continued)

*Primary Examiner* — Steven J Hylinski
(74) *Attorney, Agent, or Firm* — Seed IP Law Group PLLC

(57) ABSTRACT

Table games are enhanced by awarding chances at a bonus. The changes may be awarded based on one or more factors, for example amount wagered, time spent wagering, average wager, and/or skill level. Bonus related information may be provided to the players as a group, or individually, for example via one or more displays. A bonus pool may be formed from all or part of a separate bonus wager and/or part of a conventional wager on the outcome of a game being played at the gaming table.

162 Claims, 13 Drawing Sheets

U.S. PATENT DOCUMENTS

| | | | | | |
|---|---|---|---|---|---|
| 4,721,307 | A | | 1/1988 | Okada | 273/143 R |
| 4,725,079 | A | | 2/1988 | Koza et al. | 283/73 |
| 4,755,941 | A | | 7/1988 | Bacchi | 364/412 |
| 4,814,589 | A | | 3/1989 | Storch et al. | 235/375 |
| 4,832,341 | A | | 5/1989 | Muller et al. | 273/139 |
| 4,837,728 | A | | 6/1989 | Barrie et al. | 364/412 |
| 4,861,041 | A | | 8/1989 | Jones et al. | 273/292 |
| 4,889,367 | A | | 12/1989 | Miller | 283/88 |
| 4,951,950 | A | | 8/1990 | Normand et al. | 273/149 P |
| 5,007,641 | A | | 4/1991 | Seidman | 273/138 A |
| 5,042,809 | A | * | 8/1991 | Richardson | 463/18 |
| 5,053,612 | A | | 10/1991 | Pielemeier et al. | 235/462 |
| 5,067,713 | A | | 11/1991 | Soules et al. | 273/149 P |
| 5,096,197 | A | | 3/1992 | Embury | 273/149 R |
| 5,100,137 | A | | 3/1992 | Fulton | 273/85 CP |
| 5,110,134 | A | | 5/1992 | Laughlin et al. | 273/293 |
| 5,121,921 | A | | 6/1992 | Friedman et al. | 273/149 P |
| 5,167,413 | A | | 12/1992 | Fulton | 273/85 CP |
| 5,179,517 | A | | 1/1993 | Sarbin et al. | 364/410 |
| 5,216,234 | A | | 6/1993 | Bell | 235/494 |
| 5,242,163 | A | | 9/1993 | Fulton | 273/85 CP |
| 5,248,142 | A | | 9/1993 | Breeding | 273/138 R |
| 5,251,897 | A | | 10/1993 | Fulton | 273/85 CP |
| 5,258,837 | A | | 11/1993 | Gormley | 358/140 |
| 5,259,907 | A | | 11/1993 | Soules et al. | 156/277 |
| 5,275,400 | A | | 1/1994 | Weingardt et al. | 273/85 CP |
| 5,283,422 | A | | 2/1994 | Storch et al. | 235/375 |
| 5,319,181 | A | | 6/1994 | Shellhammer et al. | 235/462 |
| 5,321,241 | A | | 6/1994 | Craine | 235/380 |
| 5,332,219 | A | | 7/1994 | Marnell, II et al. | 273/138 A |
| 5,343,028 | A | | 8/1994 | Figarella et al. | 235/462 |
| 5,344,144 | A | | 9/1994 | Canon | 273/138 A |
| 5,364,104 | A | | 11/1994 | Jones et al. | 273/292 |
| 5,393,067 | A | | 2/1995 | Paulsen et al. | 273/292 |
| 5,397,133 | A | | 3/1995 | Penzias | 273/439 |
| 5,411,257 | A | | 5/1995 | Fulton | 273/85 CP |
| 5,417,430 | A | | 5/1995 | Breeding | 273/292 |
| 5,431,408 | A | | 7/1995 | Adams | 273/306 |
| 5,437,451 | A | | 8/1995 | Fulton | 273/138 A |
| 5,466,010 | A | | 11/1995 | Spooner | 283/67 |
| 5,472,194 | A | | 12/1995 | Breeding et al. | 273/138 A |
| 5,486,005 | A | * | 1/1996 | Neal | 273/292 |
| 5,505,461 | A | | 4/1996 | Bell et al. | 273/433 |
| 5,513,851 | A | | 5/1996 | Harris | 273/274 |
| 5,518,249 | A | | 5/1996 | Sines et al. | 273/304 |
| 5,544,892 | A | | 8/1996 | Breeding | 273/292 |
| 5,544,893 | A | | 8/1996 | Jones et al. | 273/309 |
| 5,548,110 | A | | 8/1996 | Storch et al. | 235/472 |
| 5,562,284 | A | | 10/1996 | Stevens | 273/139 |
| 5,564,700 | A | | 10/1996 | Celona | 463/27 |
| 5,570,885 | A | | 11/1996 | Ornstein | 463/27 |
| 5,586,936 | A | | 12/1996 | Bennett et al. | 463/25 |
| 5,605,334 | A | | 2/1997 | McCrea, Jr. | 273/309 |
| 5,613,912 | A | | 3/1997 | Slater | 463/25 |
| 5,636,842 | A | | 6/1997 | Cabot et al. | 273/292 |
| 5,636,843 | A | | 6/1997 | Roberts | 273/292 |
| 5,639,088 | A | | 6/1997 | Schneider et al. | 273/138.2 |
| 5,645,486 | A | | 7/1997 | Nagao et al. | 463/27 |
| 5,651,548 | A | | 7/1997 | French et al. | 273/309 |
| 5,653,635 | A | | 8/1997 | Breeding | 463/11 |
| 5,655,961 | A | | 8/1997 | Acres et al. | 463/27 |
| 5,685,774 | A | | 11/1997 | Webb | 463/13 |
| 5,698,839 | A | | 12/1997 | Jagielinski et al. | 235/493 |
| 5,707,287 | A | | 1/1998 | McCrea, Jr. | 463/27 |
| 5,711,525 | A | | 1/1998 | Breeding | 273/292 |
| 5,735,525 | A | | 4/1998 | McCrea, Jr. | 273/309 |
| 5,735,742 | A | | 4/1998 | French | 463/25 |
| 5,742,656 | A | | 4/1998 | Mikulak et al. | 377/7 |
| 5,743,800 | A | * | 4/1998 | Huard et al. | 463/26 |
| 5,766,075 | A | | 6/1998 | Cook et al. | 463/25 |
| 5,766,076 | A | | 6/1998 | Pease et al. | 463/27 |
| 5,770,533 | A | | 6/1998 | Franchi | 463/42 |
| 5,779,546 | A | * | 7/1998 | Meissner et al. | 463/25 |
| 5,780,831 | A | | 7/1998 | Seo et al. | 235/462 |
| 5,781,647 | A | * | 7/1998 | Fishbine et al. | 382/100 |
| 5,785,321 | A | | 7/1998 | van Putten et al. | 273/309 |
| 5,788,574 | A | | 8/1998 | Ornstein et al. | 463/25 |
| 5,791,988 | A | | 8/1998 | Nomi | 463/11 |
| 5,794,964 | A | | 8/1998 | Jones et al. | 273/309 |
| 5,795,225 | A | | 8/1998 | Jones et al. | 463/13 |
| 5,801,766 | A | | 9/1998 | Alden | 348/157 |
| 5,803,808 | A | | 9/1998 | Strisower | 463/11 |
| 5,803,809 | A | | 9/1998 | Yoseloff | 463/13 |
| 5,809,482 | A | | 9/1998 | Strisower | 705/30 |
| 5,813,912 | A | | 9/1998 | Shultz | 463/25 |
| 5,820,460 | A | | 10/1998 | Fulton | 463/13 |
| 5,823,879 | A | | 10/1998 | Goldberg et al. | 463/42 |
| 5,831,669 | A | | 11/1998 | Adrain | 348/143 |
| 5,836,586 | A | | 11/1998 | Marks et al. | 273/292 |
| 5,839,730 | A | | 11/1998 | Pike | 273/292 |
| 5,842,921 | A | | 12/1998 | Mindes et al. | 463/16 |
| 5,851,011 | A | | 12/1998 | Lott | 273/292 |
| 5,851,148 | A | | 12/1998 | Brune et al. | 463/25 |
| 5,855,515 | A | | 1/1999 | Pease et al. | 463/27 |
| 5,871,213 | A | | 2/1999 | Chadband et al. | 273/292 |
| 5,885,158 | A | | 3/1999 | Torango et al. | 463/27 |
| 5,890,963 | A | | 4/1999 | Yen | 463/42 |
| 5,909,876 | A | | 6/1999 | Brown | 273/309 |
| 5,911,418 | A | | 6/1999 | Adams | 273/274 |
| 5,911,419 | A | | 6/1999 | Delaney et al. | 273/292 |
| 5,911,626 | A | | 6/1999 | McCrea, Jr. | 463/27 |
| 5,919,090 | A | | 7/1999 | Mothwurf | 463/25 |
| 5,924,926 | A | | 7/1999 | Brown | 463/11 |
| 5,934,999 | A | | 8/1999 | Valdez | 463/17 |
| 5,936,527 | A | | 8/1999 | Isaacman et al. | 340/572.1 |
| 5,941,769 | A | | 8/1999 | Order | 463/12 |
| 5,957,776 | A | | 9/1999 | Hoehne | 463/25 |
| 6,001,016 | A | | 12/1999 | Walker et al. | 463/42 |
| 6,003,013 | A | | 12/1999 | Boushy et al. | 705/10 |
| 6,004,205 | A | | 12/1999 | Lauretta et al. | 463/11 |
| 6,010,404 | A | | 1/2000 | Walker et al. | 463/21 |
| 6,019,374 | A | | 2/2000 | Breeding | 273/292 |
| 6,021,949 | A | | 2/2000 | Boiron | 235/492 |
| 6,032,955 | A | | 3/2000 | Luciano et al. | 273/138.1 |
| 6,039,650 | A | | 3/2000 | Hill | 463/47 |
| 6,042,150 | A | | 3/2000 | Daley | 283/86 |
| 6,045,130 | A | | 4/2000 | Jones et al. | 273/292 |
| 6,056,641 | A | | 5/2000 | Webb | 463/13 |
| 6,059,289 | A | | 5/2000 | Vancura | 273/143 R |
| 6,062,481 | A | | 5/2000 | Storch et al. | 235/494 |
| 6,062,565 | A | | 5/2000 | Chadband et al. | 273/292 |
| 6,062,981 | A | | 5/2000 | Luciano, Jr. | 463/26 |
| 6,068,553 | A | | 5/2000 | Parker | 463/27 |
| 6,070,878 | A | | 6/2000 | Jones et al. | 273/309 |
| 6,089,978 | A | | 7/2000 | Adams | 463/20 |
| 6,089,980 | A | | 7/2000 | Gauselmann | 463/27 |
| 6,093,103 | A | | 7/2000 | McCrea, Jr. | 463/27 |
| 6,099,407 | A | | 8/2000 | Parker, Jr. et al. | 463/19 |
| 6,102,799 | A | | 8/2000 | Stupak | 463/27 |
| 6,105,964 | A | | 8/2000 | Maahs | 273/292 |
| 6,106,395 | A | | 8/2000 | Begis | 463/23 |
| 6,110,041 | A | | 8/2000 | Walker et al. | 463/20 |
| 6,110,043 | A | | 8/2000 | Olsen | 463/27 |
| 6,113,493 | A | | 9/2000 | Walker et al. | 463/25 |
| 6,117,012 | A | | 9/2000 | McCrea, Jr. | 463/27 |
| 6,120,377 | A | | 9/2000 | McGinnis, Sr. et al. | 463/20 |
| 6,123,333 | A | | 9/2000 | McGinnis, Sr. et al. | 273/146 |
| 6,126,166 | A | | 10/2000 | Lorson et al. | 273/148 R |
| 6,126,542 | A | | 10/2000 | Fier | 463/16 |
| 6,135,453 | A | | 10/2000 | Srichayaporn | 273/292 |
| 6,142,876 | A | | 11/2000 | Cumbers | 463/25 |
| 6,145,838 | A | | 11/2000 | White | 273/295 |
| 6,146,273 | A | | 11/2000 | Olsen | 463/27 |
| 6,152,822 | A | | 11/2000 | Herbert | 463/22 |
| 6,154,131 | A | | 11/2000 | Jones, II et al. | 340/540 |
| 6,155,925 | A | * | 12/2000 | Giobbi et al. | 463/20 |
| 6,165,069 | A | | 12/2000 | Sines et al. | 463/12 |
| 6,165,071 | A | | 12/2000 | Weiss | 463/24 |
| 6,166,763 | A | | 12/2000 | Rhodes et al. | 348/143 |
| 6,168,523 | B1 | | 1/2001 | Piechowiak et al. | 463/26 |
| 6,179,711 | B1 | | 1/2001 | Yoseloff | 463/25 |
| 6,183,362 | B1 | | 2/2001 | Boushy | 463/25 |
| 6,183,366 | B1 | | 2/2001 | Goldberg et al. | 463/42 |
| 6,186,894 | B1 | | 2/2001 | Mayeroff | 463/20 |
| 6,186,895 | B1 | | 2/2001 | Oliver | 463/25 |
| 6,203,430 | B1 | | 3/2001 | Walker et al. | 463/20 |
| 6,210,275 | B1 | | 4/2001 | Olsen | 463/16 |

| | | | | |
|---|---|---|---|---|
| 6,210,277 | B1 | 4/2001 | Stefan | 463/27 |
| 6,213,877 | B1 | 4/2001 | Walker et al. | 463/26 |
| 6,217,447 | B1 | 4/2001 | Lofink et al. | 463/12 |
| 6,224,483 | B1 | 5/2001 | Mayeroff | 463/20 |
| 6,224,484 | B1 | 5/2001 | Okuda et al. | 463/27 |
| 6,227,969 | B1 | 5/2001 | Yoseloff | 463/13 |
| 6,234,898 | B1 | 5/2001 | Belamant et al. | 463/25 |
| 6,244,958 | B1 | 6/2001 | Acres | 463/26 |
| 6,254,484 | B1 | 7/2001 | McCrea, Jr. | 463/27 |
| 6,264,109 | B1 | 7/2001 | Chapet et al. | 235/492 |
| 6,267,671 | B1 | 7/2001 | Hogan | 463/25 |
| 6,273,424 | B1 | 8/2001 | Breeding | 273/292 |
| 6,283,856 | B1 | 9/2001 | Mothwurf | 463/17 |
| 6,290,603 | B1 | 9/2001 | Luciano, Jr. | 463/25 |
| 6,293,864 | B1 | 9/2001 | Romero | 463/12 |
| 6,299,534 | B1 | 10/2001 | Breeding et al. | 463/25 |
| 6,299,536 | B1 | 10/2001 | Hill | 463/47 |
| 6,302,793 | B1 * | 10/2001 | Fertitta et al. | 463/25 |
| 6,309,300 | B1 | 10/2001 | Glavich | 463/26 |
| 6,312,332 | B1 * | 11/2001 | Walker et al. | 463/23 |
| 6,312,334 | B1 | 11/2001 | Yoseloff | 463/25 |
| 6,313,871 | B1 | 11/2001 | Schubert | 348/143 |
| 6,315,664 | B1 | 11/2001 | Baerlocher et al. | 463/21 |
| 6,322,078 | B1 | 11/2001 | Adams | 273/292 |
| 6,328,649 | B1 | 12/2001 | Randall et al. | 463/20 |
| 6,334,614 | B1 | 1/2002 | Breeding | 273/292 |
| 6,334,814 | B1 | 1/2002 | Adams | 463/20 |
| 6,336,863 | B1 | 1/2002 | Baerlocher et al. | 463/27 |
| 6,346,043 | B1 | 2/2002 | Colin et al. | 463/17 |
| 6,346,044 | B1 | 2/2002 | McCrea, Jr. | 463/27 |
| 6,350,199 | B1 | 2/2002 | Williams et al. | 463/16 |
| 6,364,767 | B1 | 4/2002 | Brossard et al. | 463/20 |
| 6,375,187 | B1 | 4/2002 | Baerlocher | 273/143 R |
| 6,375,569 | B1 * | 4/2002 | Acres | 463/27 |
| 6,394,902 | B1 | 5/2002 | Glavich | 463/20 |
| 6,406,023 | B1 | 6/2002 | Rowe | 273/292 |
| 6,406,369 | B1 | 6/2002 | Baerlocher et al. | 463/20 |
| 6,409,595 | B1 | 6/2002 | Uihlein et al. | 463/29 |
| 6,413,161 | B1 | 7/2002 | Baerlocher et al. | 463/20 |
| 6,413,162 | B1 | 7/2002 | Baerlocher et al. | 463/20 |
| 6,416,408 | B2 | 7/2002 | Tracy et al. | 463/16 |
| 6,419,583 | B1 | 7/2002 | Crumby et al. | 463/42 |
| 6,425,824 | B1 | 7/2002 | Baerlocher et al. | 463/16 |
| 6,439,995 | B1 | 8/2002 | Hughs-Baird et al. | 463/20 |
| 6,443,452 | B1 | 9/2002 | Brune | 273/143 R |
| 6,446,864 | B1 | 9/2002 | Kim et al. | 235/382 |
| 6,454,266 | B1 | 9/2002 | Breeding et al. | 273/292 |
| 6,460,848 | B1 | 10/2002 | Soltys et al. | 273/149 R |
| 6,461,241 | B1 | 10/2002 | Webb et al. | 463/20 |
| 6,464,582 | B1 | 10/2002 | Baerlocher et al. | 463/20 |
| 6,464,584 | B2 | 10/2002 | Oliver | 463/25 |
| 6,468,156 | B1 | 10/2002 | Hughs-Baird et al. | 463/25 |
| 6,471,208 | B2 | 10/2002 | Yoseloff et al. | 273/143 R |
| 6,471,591 | B1 | 10/2002 | Crumby | 463/26 |
| 6,494,454 | B2 | 12/2002 | Adams | 273/292 |
| 6,494,785 | B1 | 12/2002 | Gerrard et al. | 463/20 |
| 6,497,408 | B1 | 12/2002 | Walker et al. | 273/138.1 |
| 6,503,147 | B1 | 1/2003 | Stockdale et al. | 463/29 |
| 6,506,118 | B1 | 1/2003 | Baerlocher et al. | 463/25 |
| 6,508,709 | B1 | 1/2003 | Karmarkar | 463/42 |
| 6,508,710 | B1 | 1/2003 | Paravia et al. | 463/42 |
| 6,511,375 | B1 | 1/2003 | Kaminkow | 463/20 |
| 6,514,140 | B1 | 2/2003 | Storch | 463/25 |
| 6,514,141 | B1 | 2/2003 | Kaminkow et al. | 463/25 |
| 6,517,435 | B2 | 2/2003 | Soltys et al. | 463/25 |
| 6,517,436 | B2 | 2/2003 | Soltys et al. | 463/29 |
| 6,517,437 | B1 | 2/2003 | Wells et al. | 463/30 |
| 6,520,857 | B2 | 2/2003 | Soltys et al. | 463/29 |
| 6,527,271 | B2 | 3/2003 | Soltys et al. | 273/148 R |
| 6,530,836 | B2 | 3/2003 | Soltys et al. | 463/29 |
| 6,530,837 | B2 | 3/2003 | Soltys et al. | 463/29 |
| 6,532,297 | B1 * | 3/2003 | Lindquist | 382/100 |
| 6,533,276 | B2 | 3/2003 | Soltys et al. | 273/148 R |
| 6,533,662 | B2 | 3/2003 | Soltys et al. | 463/25 |
| 6,561,900 | B1 | 5/2003 | Baerlocher et al. | 463/20 |
| 6,565,433 | B1 | 5/2003 | Baerlocher et al. | 463/20 |
| 6,565,436 | B1 | 5/2003 | Baerlocher | 463/26 |
| 6,567,159 | B1 | 5/2003 | Corech | 356/71 |
| 6,569,015 | B1 | 5/2003 | Baerlocher et al. | 463/16 |
| 6,572,472 | B1 | 6/2003 | Glavich | 463/16 |
| 6,572,473 | B1 | 6/2003 | Baerlocher | 463/20 |
| 6,575,829 | B2 | 6/2003 | Coleman et al. | 463/20 |
| 6,575,834 | B1 | 6/2003 | Lindo | 463/40 |
| 6,579,180 | B2 | 6/2003 | Soltys et al. | 463/25 |
| 6,579,181 | B2 | 6/2003 | Soltys et al. | 463/25 |
| 6,582,306 | B1 | 6/2003 | Kaminkow | 463/20 |
| 6,582,307 | B2 | 6/2003 | Webb | 463/22 |
| 6,585,588 | B2 | 7/2003 | Hartl | 463/16 |
| 6,585,591 | B1 | 7/2003 | Baerlocher et al. | 463/25 |
| 6,585,592 | B1 | 7/2003 | Crumby | 463/26 |
| 6,592,458 | B1 | 7/2003 | Ho | 463/17 |
| 6,595,854 | B2 | 7/2003 | Hughs-Baird et al. | 463/20 |
| 6,595,857 | B2 | 7/2003 | Soltys et al. | 463/29 |
| 6,599,185 | B1 | 7/2003 | Kaminkow et al. | 463/16 |
| 6,599,192 | B1 | 7/2003 | Baerlocher et al. | 463/25 |
| 6,599,193 | B2 | 7/2003 | Baerlocher et al. | 463/27 |
| 6,602,135 | B1 | 8/2003 | Gerrard | 463/16 |
| 6,602,136 | B1 | 8/2003 | Baerlocher et al. | 463/16 |
| 6,602,137 | B2 | 8/2003 | Kaminkow et al. | 463/16 |
| 6,605,000 | B2 | 8/2003 | Adams | 463/20 |
| 6,607,438 | B2 | 8/2003 | Baerlocher et al. | 463/16 |
| 6,609,974 | B2 | 8/2003 | Mead et al. | 463/25 |
| 6,609,975 | B1 * | 8/2003 | Sawyer et al. | 463/26 |
| 6,620,046 | B2 | 9/2003 | Rowe | 463/25 |
| 6,629,591 | B1 | 10/2003 | Griswold et al. | 194/205 |
| 6,629,889 | B2 | 10/2003 | Mothwurf | 463/25 |
| 6,632,139 | B1 | 10/2003 | Baerlocher | 463/16 |
| 6,634,943 | B1 | 10/2003 | Baerlocher | 463/25 |
| 6,634,945 | B2 | 10/2003 | Glavich et al. | 463/25 |
| 6,638,161 | B2 | 10/2003 | Soltys et al. | 463/12 |
| 6,638,164 | B2 | 10/2003 | Randall et al. | 463/20 |
| 6,638,167 | B1 * | 10/2003 | Sawyer et al. | 463/26 |
| 6,641,484 | B2 | 11/2003 | Oles et al. | 463/47 |
| 6,645,073 | B2 | 11/2003 | Lemay et al. | 463/20 |
| 6,645,077 | B2 | 11/2003 | Rowe | 463/42 |
| 6,645,078 | B1 | 11/2003 | Mattice | 463/42 |
| 6,648,753 | B1 | 11/2003 | Tracy et al. | 463/16 |
| 6,648,754 | B2 | 11/2003 | Baerlocher et al. | 463/17 |
| 6,651,985 | B2 | 11/2003 | Sines et al. | 273/309 |
| 6,656,048 | B2 | 12/2003 | Olsen | 463/25 |
| 6,659,461 | B2 | 12/2003 | Yoseloff et al. | 273/274 |
| 6,659,864 | B2 | 12/2003 | McGahn et al. | 463/16 |
| 6,663,488 | B1 | 12/2003 | Adams | 463/17 |
| 6,663,489 | B2 | 12/2003 | Baerlocher | 463/20 |
| 6,663,490 | B2 | 12/2003 | Soltys et al. | 463/25 |
| 6,669,559 | B1 | 12/2003 | Baerlocher et al. | 463/16 |
| 6,672,589 | B1 | 1/2004 | Lemke et al. | 273/236 |
| 6,682,423 | B2 | 1/2004 | Brosnan et al. | 463/29 |
| 6,685,564 | B2 | 2/2004 | Oliver | 463/25 |
| 6,688,975 | B2 | 2/2004 | Baerlocher et al. | 463/16 |
| 6,688,977 | B1 | 2/2004 | Baerlocher et al. | 463/25 |
| 6,688,979 | B2 | 2/2004 | Soltys et al. | 463/25 |
| 6,692,354 | B2 | 2/2004 | Tracy et al. | 463/16 |
| 6,692,355 | B2 | 2/2004 | Baerlocher et al. | 463/16 |
| 6,702,291 | B2 | 3/2004 | Grebler et al. | 273/292 |
| 6,712,695 | B2 | 3/2004 | Mothwurf et al. | 463/25 |
| 6,712,696 | B2 | 3/2004 | Soltys et al. | 463/25 |
| 6,712,698 | B2 | 3/2004 | Paulsen et al. | 463/30 |
| 6,719,632 | B2 | 4/2004 | Palmer et al. | 463/25 |
| 6,722,974 | B2 | 4/2004 | Sines et al. | 463/12 |
| 6,722,981 | B2 | 4/2004 | Kaminkow et al. | 463/25 |
| 6,722,982 | B2 | 4/2004 | Kaminkow et al. | 463/25 |
| 6,722,983 | B2 | 4/2004 | Kaminkow et al. | 463/26 |
| 6,722,985 | B2 | 4/2004 | Criss-Puszkiewicz et al. | 463/29 |
| 6,726,099 | B2 | 4/2004 | Becker et al. | 235/380 |
| 6,726,563 | B1 | 4/2004 | Baerlocher et al. | 463/25 |
| 6,726,565 | B2 | 4/2004 | Hughs-Baird | 463/25 |
| 6,728,740 | B2 | 4/2004 | Kelly et al. | 708/250 |
| 6,729,956 | B2 | 5/2004 | Wolf et al. | 463/25 |
| 6,733,386 | B2 | 5/2004 | Cuddy et al. | 463/17 |
| 6,733,389 | B2 | 5/2004 | Webb et al. | 463/20 |
| 6,739,973 | B1 | 5/2004 | Lucchesi et al. | 463/35 |
| 6,743,102 | B1 | 6/2004 | Fiechter et al. | 463/42 |
| 6,746,330 | B2 | 6/2004 | Cannon | 463/25 |
| 6,749,504 | B2 | 6/2004 | Hughs-Baird | 463/25 |
| 6,755,741 | B1 | 6/2004 | Rafaeli | 463/25 |
| 6,758,747 | B2 | 7/2004 | Baerlocher | 463/16 |
| 6,758,750 | B2 | 7/2004 | Baerlocher et al. | 463/25 |

| | | | | |
|---|---|---|---|---|
| 6,758,751 | B2 | 7/2004 | Soltys et al. | 463/29 |
| 6,769,983 | B2 | 8/2004 | Slomiany | 463/16 |
| 6,789,801 | B2 | 9/2004 | Snow | 273/292 |
| 6,808,173 | B2 | 10/2004 | Snow | 273/292 |
| 6,811,486 | B1 | 11/2004 | Luciano, Jr. | 463/24 |
| 6,846,238 | B2 | 1/2005 | Wells | 463/39 |
| 6,848,994 | B1 * | 2/2005 | Knust et al. | 463/25 |
| 6,874,786 | B2 | 4/2005 | Bruno et al. | 273/306 |
| 6,896,618 | B2 | 5/2005 | Benoy et al. | 463/25 |
| 6,923,446 | B2 | 8/2005 | Snow | 273/292 |
| 6,938,900 | B2 | 9/2005 | Snow | 273/292 |
| 6,955,599 | B2 | 10/2005 | Bourbour et al. | 463/13 |
| 6,960,134 | B2 | 11/2005 | Hartl et al. | 463/20 |
| 6,969,319 | B2 | 11/2005 | Rowe et al. | 463/25 |
| 6,986,514 | B2 | 1/2006 | Snow | 273/292 |
| 6,991,544 | B2 | 1/2006 | Soltys et al. | 463/42 |
| 7,000,921 | B2 | 2/2006 | Schultz | 273/292 |
| 7,005,985 | B1 | 2/2006 | Steeves | 340/572.1 |
| 7,011,309 | B2 | 3/2006 | Soltys et al. | 273/149 R |
| 7,029,009 | B2 | 4/2006 | Grauzer et al. | 273/149 P |
| 7,037,195 | B2 | 5/2006 | Schneider et al. | 463/25 |
| 7,063,618 | B2 * | 6/2006 | Walker et al. | 463/25 |
| 7,099,035 | B2 | 8/2006 | Brooks et al. | 358/1.15 |
| 7,103,438 | B2 | 9/2006 | Hallowell et al. | 700/116 |
| 7,112,138 | B2 | 9/2006 | Hedrick et al. | 463/29 |
| 7,198,571 | B2 | 4/2007 | LeMay et al. | 463/25 |
| 7,213,812 | B2 | 5/2007 | Schubert et al. | 273/149 R |
| 7,229,353 | B2 * | 6/2007 | Seelig | 463/25 |
| 7,271,727 | B2 | 9/2007 | Steeves | 340/572.7 |
| 7,291,068 | B2 | 11/2007 | Bryant et al. | 463/25 |
| 7,303,475 | B2 | 12/2007 | Britt et al. | 463/42 |
| 7,309,065 | B2 | 12/2007 | Yoseloff et al. | 273/292 |
| 7,311,605 | B2 | 12/2007 | Moser | 463/25 |
| 7,316,615 | B2 | 1/2008 | Soltys et al. | 463/25 |
| 7,329,185 | B2 | 2/2008 | Conover et al. | 463/25 |
| 7,331,520 | B2 | 2/2008 | Silva et al. | 235/381 |
| 7,331,579 | B2 | 2/2008 | Snow | 273/292 |
| 7,331,859 | B2 | 2/2008 | Hornik et al. | 463/16 |
| 7,351,145 | B1 | 4/2008 | Ornstein et al. | 463/25 |
| 7,364,510 | B2 | 4/2008 | Walker et al. | 463/42 |
| 7,390,256 | B2 | 6/2008 | Soltys et al. | 463/12 |
| 7,404,763 | B2 | 7/2008 | Malone et al. | 463/13 |
| 7,404,765 | B2 | 7/2008 | Soltys et al. | 463/25 |
| 7,407,438 | B2 | 8/2008 | Schubert et al. | 463/22 |
| 7,427,233 | B2 | 9/2008 | Walker et al. | 463/16 |
| 7,427,234 | B2 | 9/2008 | Soltys et al. | 463/16 |
| 7,427,236 | B2 | 9/2008 | Kaminkow et al. | 463/26 |
| 7,434,805 | B2 | 10/2008 | Grauzer et al. | 273/149 R |
| 7,481,430 | B1 | 1/2009 | Jackson et al. | 273/138.1 |
| 7,510,194 | B2 | 3/2009 | Soltys et al. | 273/293 |
| 7,534,169 | B2 | 5/2009 | Amaitis et al. | 463/39 |
| 7,559,839 | B2 | 7/2009 | Bahar | 463/25 |
| 7,578,739 | B2 | 8/2009 | Gauselmann | 463/27 |
| 7,585,217 | B2 | 9/2009 | Lutnick et al. | 463/16 |
| 7,618,317 | B2 | 11/2009 | Jackson | 463/24 |
| 7,621,809 | B2 * | 11/2009 | Baerlocher et al. | 463/16 |
| 7,662,039 | B2 * | 2/2010 | Matsuno et al. | 463/25 |
| 7,684,874 | B2 | 3/2010 | Schlottmann et al. | 700/9 |
| 7,690,976 | B2 * | 4/2010 | Edidin et al. | 463/13 |
| 7,699,697 | B2 | 4/2010 | Darrah et al. | 463/16 |
| 7,730,198 | B2 | 6/2010 | Ruppert et al. | 709/230 |
| 7,736,221 | B2 * | 6/2010 | Black et al. | 463/13 |
| 7,744,462 | B2 | 6/2010 | Grav et al. | 463/27 |
| 7,753,781 | B2 | 7/2010 | Storch | 463/25 |
| 7,753,789 | B2 | 7/2010 | Walker et al. | 463/42 |
| 7,753,790 | B2 | 7/2010 | Nguyen et al. | 463/42 |
| 7,758,419 | B2 * | 7/2010 | Rowe et al. | 463/25 |
| 7,775,868 | B2 | 8/2010 | Toyoda | 463/12 |
| 7,780,525 | B2 | 8/2010 | Walker et al. | 463/29 |
| 7,780,526 | B2 | 8/2010 | Nguyen et al. | 463/29 |
| 7,780,529 | B2 | 8/2010 | Rowe et al. | 463/42 |
| 7,819,745 | B2 * | 10/2010 | Cuddy et al. | 463/26 |
| 7,824,264 | B2 * | 11/2010 | Bartholomew et al. | 463/26 |
| 7,824,267 | B2 | 11/2010 | Cannon et al. | 463/42 |
| 7,828,649 | B2 * | 11/2010 | Cuddy et al. | 463/26 |
| 7,846,020 | B2 | 12/2010 | Walker et al. | 463/29 |
| 7,854,654 | B2 | 12/2010 | Baerlocher et al. | 463/27 |
| 7,862,425 | B2 | 1/2011 | Cavagna | 463/25 |
| 7,867,081 | B2 | 1/2011 | Schneider et al. | 463/25 |

| | | | | |
|---|---|---|---|---|
| 7,874,920 | B2 | 1/2011 | Hornik et al. | 463/42 |
| 7,892,093 | B2 * | 2/2011 | Kniesteadt et al. | 463/25 |
| 7,901,294 | B2 | 3/2011 | Walker et al. | 463/42 |
| 7,937,464 | B2 | 5/2011 | Ruppert et al. | 709/224 |
| 2001/0016515 | A1 | 8/2001 | Oliver | 463/25 |
| 2001/0018361 | A1 * | 8/2001 | Acres | 463/27 |
| 2001/0041612 | A1 | 11/2001 | Garahi et al. | 463/29 |
| 2002/0063389 | A1 | 5/2002 | Breeding et al. | 273/292 |
| 2002/0077170 | A1 * | 6/2002 | Johnson et al. | 463/16 |
| 2002/0084587 | A1 | 7/2002 | Bennett et al. | 273/309 |
| 2002/0111210 | A1 | 8/2002 | Luciano, Jr. et al. | 463/29 |
| 2002/0123376 | A1 | 9/2002 | Walker et al. | 463/11 |
| 2002/0142825 | A1 | 10/2002 | Lark et al. | 463/16 |
| 2002/0142846 | A1 | 10/2002 | Paulsen | 463/43 |
| 2002/0147042 | A1 * | 10/2002 | Vuong et al. | 463/40 |
| 2002/0195773 | A1 | 12/2002 | Dunn | 273/274 |
| 2002/0198044 | A1 * | 12/2002 | Walker et al. | 463/25 |
| 2003/0003997 | A1 * | 1/2003 | Vuong et al. | 463/42 |
| 2003/0011127 | A1 | 1/2003 | Vancura et al. | 273/236 |
| 2003/0022714 | A1 | 1/2003 | Oliver | 463/25 |
| 2003/0027625 | A1 | 2/2003 | Rowe | 463/20 |
| 2003/0027638 | A1 | 2/2003 | Schneider et al. | 463/42 |
| 2003/0028480 | A1 | 2/2003 | Rowe | 705/39 |
| 2003/0032474 | A1 | 2/2003 | Kaminkow | 463/25 |
| 2003/0036425 | A1 | 2/2003 | Kaminkow et al. | 463/25 |
| 2003/0042679 | A1 | 3/2003 | Snow | 273/292 |
| 2003/0045354 | A1 | 3/2003 | Giobbi | 463/40 |
| 2003/0064798 | A1 | 4/2003 | Grauzer et al. | 463/29 |
| 2003/0075869 | A1 | 4/2003 | Breeding et al. | 273/292 |
| 2003/0083126 | A1 | 5/2003 | Paulsen | 463/25 |
| 2003/0186739 | A1 | 10/2003 | Paulsen et al. | 463/25 |
| 2003/0195037 | A1 | 10/2003 | Vuong et al. | 463/29 |
| 2003/0199320 | A1 | 10/2003 | Nguyen et al. | 463/42 |
| 2003/0212597 | A1 | 11/2003 | Ollins | 705/14 |
| 2003/0216165 | A1 | 11/2003 | Singer et al. | 463/20 |
| 2003/0220135 | A1 | 11/2003 | Gauselmann | 463/25 |
| 2003/0232640 | A1 | 12/2003 | Walker et al. | 463/16 |
| 2003/0232651 | A1 | 12/2003 | Huard et al. | 463/42 |
| 2004/0002388 | A1 | 1/2004 | Larsen et al. | 463/43 |
| 2004/0005920 | A1 | 1/2004 | Soltys et al. | 463/25 |
| 2004/0043815 | A1 | 3/2004 | Kaminkow | 463/25 |
| 2004/0043820 | A1 | 3/2004 | Schlottmann | 463/43 |
| 2004/0090003 | A1 | 5/2004 | Snow | 273/274 |
| 2004/0110557 | A1 | 6/2004 | Rowe | 463/25 |
| 2004/0132529 | A1 | 7/2004 | Mkrtchyan et al. | 463/29 |
| 2004/0142743 | A1 | 7/2004 | Oliver | 463/25 |
| 2004/0166940 | A1 | 8/2004 | Rothschild | 463/42 |
| 2004/0219982 | A1 | 11/2004 | Khoo et al. | 463/42 |
| 2004/0259630 | A1 * | 12/2004 | Huard et al. | 463/25 |
| 2005/0026680 | A1 | 2/2005 | Gururajan | 463/25 |
| 2005/0043087 | A1 * | 2/2005 | Seelig et al. | 463/25 |
| 2005/0043094 | A1 | 2/2005 | Nguyen et al. | 463/42 |
| 2005/0051965 | A1 | 3/2005 | Gururajan | 273/292 |
| 2005/0054408 | A1 | 3/2005 | Steil et al. | 463/11 |
| 2005/0059479 | A1 | 3/2005 | Soltys et al. | 463/25 |
| 2005/0101367 | A1 | 5/2005 | Soltys et al. | 463/12 |
| 2005/0116020 | A1 | 6/2005 | Smolucha et al. | 235/375 |
| 2005/0119052 | A1 | 6/2005 | Russell et al. | 463/42 |
| 2005/0121852 | A1 | 6/2005 | Soltys et al. | 273/149 P |
| 2005/0153778 | A1 | 7/2005 | Nelson et al. | 463/42 |
| 2005/0156318 | A1 | 7/2005 | Douglas | 257/761 |
| 2005/0164761 | A1 | 7/2005 | Tain | 463/13 |
| 2005/0215311 | A1 | 9/2005 | Hornik et al. | 463/20 |
| 2005/0239542 | A1 | 10/2005 | Olsen | 463/27 |
| 2005/0255911 | A1 | 11/2005 | Nguyen et al. | 463/25 |
| 2005/0255922 | A1 * | 11/2005 | Nguyen et al. | 463/42 |
| 2005/0258597 | A1 | 11/2005 | Soltys et al. | 273/274 |
| 2005/0266919 | A1 | 12/2005 | Rowe et al. | 463/25 |
| 2005/0282614 | A1 | 12/2005 | Gauselmann | 463/20 |
| 2005/0282623 | A1 | 12/2005 | Matsuno et al. | 463/25 |
| 2005/0282626 | A1 | 12/2005 | Manfredi et al. | |
| 2005/0288083 | A1 | 12/2005 | Downs, III | 463/11 |
| 2005/0288084 | A1 | 12/2005 | Schubert | 463/11 |
| 2005/0288085 | A1 | 12/2005 | Schubert et al. | 463/11 |
| 2006/0079317 | A1 | 4/2006 | Flemming et al. | 463/25 |
| 2006/0199649 | A1 | 9/2006 | Soltys et al. | 463/47 |
| 2006/0205461 | A1 | 9/2006 | LaRocca et al. | 463/1 |
| 2006/0205508 | A1 | 9/2006 | Green | 463/40 |
| 2006/0205519 | A1 | 9/2006 | Soltys | 463/47 |

| | | | | |
|---|---|---|---|---|
| 2006/0211481 | A1 | 9/2006 | Soltys et al. | 463/16 |
| 2006/0247013 | A1 | 11/2006 | Walker et al. | 463/20 |
| 2006/0281529 | A1 | 12/2006 | Seelig et al. | 463/20 |
| 2007/0004500 | A1 | 1/2007 | Soltys et al. | 463/22 |
| 2007/0015583 | A1 | 1/2007 | Tran | 463/40 |
| 2007/0057466 | A1 | 3/2007 | Soltys et al. | 273/292 |
| 2007/0060365 | A1 | 3/2007 | Tien et al. | 463/42 |
| 2007/0111775 | A1 | 5/2007 | Yoseloff | 463/16 |
| 2007/0117604 | A1 * | 5/2007 | Hill | 463/16 |
| 2007/0117608 | A1 | 5/2007 | Roper et al. | 463/16 |
| 2007/0167235 | A1 | 7/2007 | Naicker | 463/42 |
| 2007/0191102 | A1 | 8/2007 | Coliz et al. | 463/42 |
| 2007/0235521 | A1 | 10/2007 | Mateen et al. | 235/379 |
| 2007/0241496 | A1 | 10/2007 | Fleckenstein | 273/149 R |
| 2007/0243927 | A1 | 10/2007 | Soltys | 463/25 |
| 2007/0243935 | A1 | 10/2007 | Huizinga | 463/42 |
| 2007/0259709 | A1 | 11/2007 | Kelly et al. | 463/20 |
| 2007/0259711 | A1 | 11/2007 | Thomas | 463/22 |
| 2007/0287534 | A1 | 12/2007 | Fleckenstein | 463/29 |
| 2007/0287535 | A1 | 12/2007 | Soltys | 463/29 |
| 2007/0293303 | A1 | 12/2007 | Shayesteh | 463/25 |
| 2007/0298868 | A1 | 12/2007 | Soltys | 463/25 |
| 2008/0004108 | A1 | 1/2008 | Klinkhammer | 463/29 |
| 2008/0026832 | A1 | 1/2008 | Stevens et al. | 463/26 |
| 2008/0026848 | A1 | 1/2008 | Byng | 463/42 |
| 2008/0038035 | A1 | 2/2008 | Shuldman et al. | 400/76 |
| 2008/0045341 | A1 | 2/2008 | Englman | 463/42 |
| 2008/0064501 | A1 | 3/2008 | Patel | 463/40 |
| 2008/0076536 | A1 | 3/2008 | Shayesteh | 463/25 |
| 2008/0090651 | A1 | 4/2008 | Baerlocher | 463/27 |
| 2008/0108433 | A1 | 5/2008 | DiMichele et al. | 463/40 |
| 2008/0113704 | A1 | 5/2008 | Jackson | 463/13 |
| 2008/0113764 | A1 | 5/2008 | Soltys | 463/22 |
| 2008/0113773 | A1 | 5/2008 | Johnson et al. | |
| 2008/0113781 | A1 | 5/2008 | Soltys et al. | 463/28 |
| 2008/0119284 | A1 | 5/2008 | Luciano, Jr. et al. | |
| 2008/0217851 | A1 | 9/2008 | Colton | 273/274 |
| 2008/0287197 | A1 | 11/2008 | Ruppert et al. | 463/42 |
| 2008/0311971 | A1 | 12/2008 | Dean | 463/20 |
| 2009/0005176 | A1 | 1/2009 | Morrow et al. | 463/43 |
| 2009/0011833 | A1 | 1/2009 | Seelig et al. | 463/42 |
| 2009/0029775 | A1 | 1/2009 | Ruppert et al. | 463/42 |
| 2009/0069076 | A1 | 3/2009 | Silvestro | 463/25 |
| 2009/0075739 | A1 * | 3/2009 | Richardson | 463/42 |
| 2009/0104981 | A1 | 4/2009 | Koyama | 463/25 |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0118006 | A1 | 5/2009 | Kelly et al. | 463/31 |
| 2009/0163279 | A1 | 6/2009 | Hermansen et al. | 463/42 |
| 2009/0170594 | A1 | 7/2009 | Delaney et al. | 463/25 |
| 2009/0176556 | A1 | 7/2009 | Gagner et al. | 463/25 |
| 2009/0176580 | A1 | 7/2009 | Herrmann et al. | 463/43 |
| 2009/0239625 | A1 * | 9/2009 | Yoshizawa | 463/20 |
| 2009/0253483 | A1 | 10/2009 | Pacey et al. | 463/20 |
| 2009/0275395 | A1 | 11/2009 | McAllister et al. | 463/25 |
| 2009/0275402 | A1 | 11/2009 | Backover et al. | 463/29 |
| 2009/0307069 | A1 | 12/2009 | Meyerhofer | 705/14.12 |
| 2010/0016068 | A1 | 1/2010 | White et al. | 463/25 |
| 2010/0048291 | A1 | 2/2010 | Warkentin | 463/25 |
| 2010/0125851 | A1 | 5/2010 | Singh et al. | 718/104 |
| 2010/0130280 | A1 | 5/2010 | Arezina et al. | 463/20 |
| 2010/0151926 | A1 | 6/2010 | Ruppert et al. | 463/1 |
| 2010/0161798 | A1 | 6/2010 | Ruppert et al. | 709/225 |
| 2010/0234104 | A1 | 9/2010 | Ruppert et al. | 463/30 |
| 2011/0009184 | A1 | 1/2011 | Byng | 463/20 |

FOREIGN PATENT DOCUMENTS

| | | | |
|---|---|---|---|
| DE | 44 39 502 | C1 | 9/1995 |
| DE | 197 48 930 | A1 | 5/1998 |
| DE | 199 40 954 | A1 | 3/2001 |
| EP | 0 327 069 | A2 | 8/1989 |
| EP | 0 790 848 BI | | 8/1997 |
| EP | 0 700 980 | B1 | 11/1999 |
| FR | 2 775 196 | A1 | 8/1999 |
| GB | 2 382 034 | A | 5/2003 |
| KR | 2002-0061793 | | 7/2002 |
| WO | 96/03188 | A1 | 2/1996 |
| WO | 96/36253 | | 11/1996 |
| WO | 97/13227 | A1 | 4/1997 |
| WO | 97/36658 | A1 | 10/1997 |
| WO | 00/22585 | A2 | 4/2000 |
| WO | 02/05914 | A1 | 1/2002 |
| WO | 03/060846 | A2 | 7/2003 |
| WO | 2005/035084 | | 4/2005 |

OTHER PUBLICATIONS

Bally Technologies, Inc., iVIEW, http://ballytech.com/systems/product.cfm?id=9, download date Nov. 6, 2007, 2 pages.
Hewlett Packard Handhelds, accessed Sep. 8, 2003, URL = http://www.shopping.hp.com/cgi-bin/hpdirect/shopping/scripts/home/store_access.jsp?temp..., 2 pages.
U.S. Appl. No. 11/938,203, filed Nov. 9, 2007, Kelly et al.
U.S. Appl. No. 11/966,840, filed Dec. 28, 2007, Delaney et al.
U.S. Appl. No. 12/111,760, filed Apr. 29, 2008, Kisenwether et al.
U.S. Appl. No. 12/112,386, filed Apr. 30, 2008, Kisenwether et al.
U.S. Appl. No. 12/112,389, filed Apr. 30, 2008, Kisenwether et al.
U.S. Appl. No. 12/112,410, filed Apr. 30, 2008, McMahan et al.
U.S. Appl. No. 12/112,501, filed Apr. 30, 2008, Nelson.
U.S. Appl. No. 12/112,554, filed Apr. 30, 2008, Nelson et al.
U.S. Appl. No. 12/112,582, filed Apr. 30, 2008, Kelly et al.
U.S. Appl. No. 12/112,740, filed Apr. 30, 2008, Kisenwether et al.
U.S. Appl. No. 12/112,770, filed Apr. 30, 2008, Rehm et al.
U.S. Appl. No. 12/112,928, filed Apr. 30, 2008, Young et al.
U.S. Appl. No. 12/113,021, filed Apr. 30, 2008, Singh et al.
Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Gros, R., "All You Ever Wanted to Know About Table Games," reprinted from *Global Gaming Business*, Aug. 1, 2003, 2 pages.
Pro, L.V., "Book Review—The Card Counter's Guide to Casino Surveillance," *Blackjack Insider Newsletter*, May 2003, #40, accessed Aug. 25, 2006, URL = http:/bjinsider.com/newsletter_40_surveillance.shtml, 5 pages.
Snyder, A., "The High-Tech Eye," excerpt from *Blackjack Forum*, Spring 1997, accessed Dec. 21, 2005, from Casino Software & Services, LLC, URL = http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.
Winkler, C., "Product Spotlight: MindPlay," reprinted from *Gaming and Leisure Technology*, Fall 2003, 2 pages.
Bally TMS, "MP21—Automated Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.
Bravo Gaming Systems, "Casino Table Wager Analysis and Player Tracking System—Table Operations/Unique Features," accessed Apr. 11, 2005, URL = http://www.genesisgaming.com, 4 pages.
Casino Software & Services, LLC., accessed Aug. 25, 2006, URL = http:/casinosoftware.com/home.html, 6 pages.
*Gambling Magazine*, "Gaming Company Takes RFID to the Casino," Dec. 27, 2004, accessed Aug. 25, 2006, URL = http:/www.gamblingmagazine.com/managearticle.asp?C=290&A=13186, 4 pages.
Hewlett Packard Handhelds, accessed Sep. 8, 2003, URL = http:/www.shopping.hp.com/cgi-bin/hpdirect/shopping/scripts/home/store_access.jsp?temp..., 2 pages.
International Guild of Hospitality & Restaurant Managers, "Shuffle Master, Inc. (NasdaqNM:SHFL)," accessed Dec. 30, 2003, URL =http://hospitalityguide.com/Financial/Casinos/Shuffle.htm, 3 pages.

Linksys WAP11 "Wireless Network Access Point," accessed Sep. 8, 2003, URL = http:/www.linksys.com/products/products.asp-?prid=157&grid=, 4 pages.
MagTek, "Port Powered Swipe Reader," Technical Reference Manual, Manual Part No. 99875094 Rev 12, Jun. 2003, 20 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Semtek PDA & Handheld Devices, Compaq iSwipe™ Magnetic Card Reader, accessed Sep. 8, 2003, URL = http:/www.semtek.com/products/iswipe.html, 3 pages.
Plaintiff's Declaration of Lawrence Luciano in Opposition to Shuffle Master's Motion for Preliminary Injunction, *Card, LLC* v. *Shuffle Master, Inc.,* D. Nev. (No. CV-N-03-0244-ECR-(RAM)), Nov. 24, 2003.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents the Ultimate Player Rating System . . . Bloodhound Sniffs Out the Pros and Cons," Dec. 31, 1997, 6 pages.
European Search Report relating to European Patent Application No. 07016213.6, mailed Feb. 21, 2008, 5 pages.
European Office Action relating to European Patent Application No. 07016213.6, mailed Jul. 17, 2008, 1 page.
Response to European Office Action relating to European Patent Application No. 07016213.6, mailed Dec. 4, 2008, 16 pages.
Australian Office Action relating to Australian Patent Application No. 2007205809, mailed May 17, 2011, 6 pages.
Macao Office Action relating to Macao Patent Application No. I/000504, mailed Sep. 23, 2010, 10 pages.
Response to Macao Office Action relating to Macao Patent Application No. I/000504, mailed Jan. 20, 2011, 13 pages.
Macao Office Action relating to Macao Patent Application No. I/00504, mailed Jun. 16, 2011, 6 pages.
Palermo, V. "Near-field magnetic comms emerges," EE Times Design, Oct. 31, 2003.
Response to Macau Office Action dated Jun. 16, 2011 relating to Macau Patent Application No. I/000504, mailed Aug. 30, 2011, 6 pages.
Thorp, E., "Beat the Dealer," Vintage Books Edition, Feb. 1966, (cover page and index), 6 pages.
US 6,599,191, 07/2003, Breeding et al. (withdrawn)

* cited by examiner

SYSTEMS, METHODS AND ARTICLES TO ENHANCE PLAY AT GAMING TABLES WITH BONUSES

CROSS-REFERENCE TO RELATED APPLICATION

This application claims the benefit under 35 U.S.C. §119 (e) of U.S. Provisional Patent Application No. 60/838,280 filed Aug. 17, 2006; where this provisional application is incorporated herein by reference in its entirety.

BACKGROUND OF THE INVENTION

1. Field of the Invention

This description generally relates to the field of table gaming, and more particularly to games played with a gaming tables.

2. Description of the Related Art

There are numerous games played at gaming tables. For example, roulette, craps, and card games played with playing cards.

There are a large variety of playing card games. For example, blackjack, baccarat, various types of poker, LET IT RIDE®, to name a few. Card games may be played with one or more standard decks of playing cards. A standard deck of playing cards typically comprises fifty-two playing cards, each playing card having a combination of a rank symbol and a suit symbol, selected from thirteen rank symbols (i.e., 2, 3, 4, 5, 6, 7, 8, 9, 10, J, Q, K, and A) and four suit symbols (i.e., ♡, ♧, ♢, and ♤). Some games may include non-standard playing cards, for example playing cards with symbols other than the rank and suit symbols associated with a standard deck.

In some instances playing card games involve wagering, where money and/or prizes may be won. In other instances playing card games are played for fun or recreation without wagering. In either case, it is typically desirable to randomize the set of playing cards before dealing the playing cards to the participants (e.g., players and/or dealer). Randomizing is typically referred to as shuffling, which may be performed manually by riffling or interleaving the corners of two stacks of playing cards by hand, or may be performed automatically by an automatic card shuffling machine.

While there may exist variation from casino-to-casino, playing card games typically have a fixed set of theoretical or "true" odds associated with them. The theoretical or true odds are reflected in the schedule of payout or "house" odds associated with the game, and typically provide for a house edge or advantage (e.g., theoretical hold). Many casinos set a house advantage or theoretical hold of at least 0.5%, which means that the house would likely earn 0.5% of every dollar wagered for the particular game over the long term. The house advantage may be as high as 30%, for example for the game Let-It-Ride®.

A casino may, for example, provide a schedule of payout or house odds for blackjack. A typical house odds schedule may provide for a 1:1 or "even money" payout for all winning bets with the exception of blackjack (i.e., initial two cards dealt to player have a total value of twenty-one). A blackjack may be paid at 3:1, unless the dealer also has a blackjack which is typically considered a tie (i.e., push) and no money is exchanged. The theoretical or true odds reflect the statistical probabilities of the occurrence of certain events over a large number of attempts or trials.

The casino typically has a house advantage due to a difference between the theoretical or true odds and the payout or house odds. The casino may achieve a higher house advantage due to specific rules of the game. For example, under most blackjack rules the dealer selects hit cards only after all of the players have completed their hands. This provides the opportunity for the players to draw hands with a value exceeding twenty-one (i.e., bust) and lose, without the dealer having to take any hit cards. Thus, the dealer avoids the possibility of busting, and losing to a player that has already gone bust. Consequently, the house enjoys a further advantage over the players. The casino may obtain a further house advantage by setting the rules with respect to when the dealer must take additional playing cards (e.g., stand on hand with value of a hard or soft 17 points, hit on 16 points, etc.). The casino may obtain a further house advantage by selecting the total number of decks from which the card game will be dealt. Thus, while the basic rules determine the theoretical or true odds of the game, variations in the rules as well as the house odds may effect the house advantage.

At least in blackjack, the theoretical true odds reflect the probability of certain outcomes over a large number of hands, predicated on "perfect play" by a player. Typically, players cannot play perfectly, and may make decisions (e.g., hit or stand, split, double down) that do not accord with the decision that would provide the highest probability of winning (e.g., "basic" strategy). Thus, a highly skilled player may approach the theoretical odds for a game, while a player with less skill will be playing at some level below the theoretical odds for the game. This provides a further advantage to the casino or house. Some players adopt various playing strategies to obtain or to try to exceed the theoretical odds. Some of these strategies are legal, some illegal, and some while legal, are discouraged by certain gaming establishments. For example, a player may play basic strategy as outlined in numerous references on gaming. Some players may track the playing cards that appear on the gaming table using various card counting strategies (e.g., fives count, tens count), also outlined in numerous references on gaming. This may allow the player to adjust the amount of wagers based on whether the cards remaining to be dealt are thought to be favorable or unfavorable. For example, a set or "deck" having a relatively high percentage of playing cards with a value of ten is typically considered favorable to the dealer, while a relatively low percentage of playing cards with values of 2-8 is typically considered favorable to the player. This allows highly skilled players to reduce the casino's theoretical advantage on the game, or on a particular hand or round of a game.

Casinos and other gaming establishments are continually looking for ways to make gaming fresher and more exciting for their patrons. For example, many casinos offer the ability to place bonus wagers and/or progressive wagers. New approaches to varying existing table games are highly desirable.

BRIEF SUMMARY OF THE EMBODIMENTS OF THE INVENTION

In one embodiment, a system to enhance table gaming may be summarized as including: means for determining a respective value for each of a plurality of a players playing at one or more gaming tables, the values indicative of at least an approximation of at least an amount wagered by the respective player; means for providing a number of chances at a bonus to each of at least some of the plurality of players, the number of chances based at least in part on the respective value; and means for determining at least one winner of the bonus from the chances.

In another embodiment, a method of enhancing table gaming may be summarized including: for each of a plurality of players, determining at least approximately an amount of time spent by the player at a gaming table; for each of at least some of the plurality of players, providing a number of chances at a bonus, the number of chances based at least in part on the amount of time spent by the player at the gaming table; and from time-to-time, determining at least one winner of the bonus from the chances.

In another embodiment, a method of enhancing table gaming may be summarized including: for each of a plurality of players, determining at least approximately an amount of wagered by the player at a gaming table; for each of at least some of the plurality of players, providing a number of chances at a bonus, the number of chances based at least in part on the amount wagered by the player at the gaming table; and from time-to-time, determining at least one winner of the bonus from the chances.

In another embodiment, a method of enhancing table gaming may be summarized including: for each of a plurality of players, determining at least approximately an average amount wagered by the player at a gaming table and at least approximately an amount of time spent wagering by the player at the gaming table; for each of at least some of the plurality of players, providing a number of chances at a bonus, the number of chances based at least in part on the amount wagered and time spent wagering by the player at the gaming table; and from time-to-time, determining at least one winner of the bonus from the chances.

In another embodiment, a method of enhancing table gaming may be summarized including: for each of a plurality of players playing at a gaming table, determining at least approximately a respective theoretical advantage of the player representative of a skill level of the respective player; for each of at least some of the plurality of players, providing a number of chances at a bonus, the number of chances based at least in part on the respective theoretical advantage of the player; and from time-to-time, determining at least one winner of the bonus from the chances.

In another embodiment, a method of enhancing table gaming may be summarized including: for each of a plurality of players playing a table game at a gaming table, providing a number of chances at a bonus, each of the chances having the same probability of being selected as a winner as each of the other chances; at a first time, displaying an indication of at least a first player's chances with respect to a bonus pool; and from time-to-time, determining at least one winner of the bonus based at least in part on the chances.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with servers, networks, displays, media handling and/or printers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Description of Gaming Environments

Figure 1:
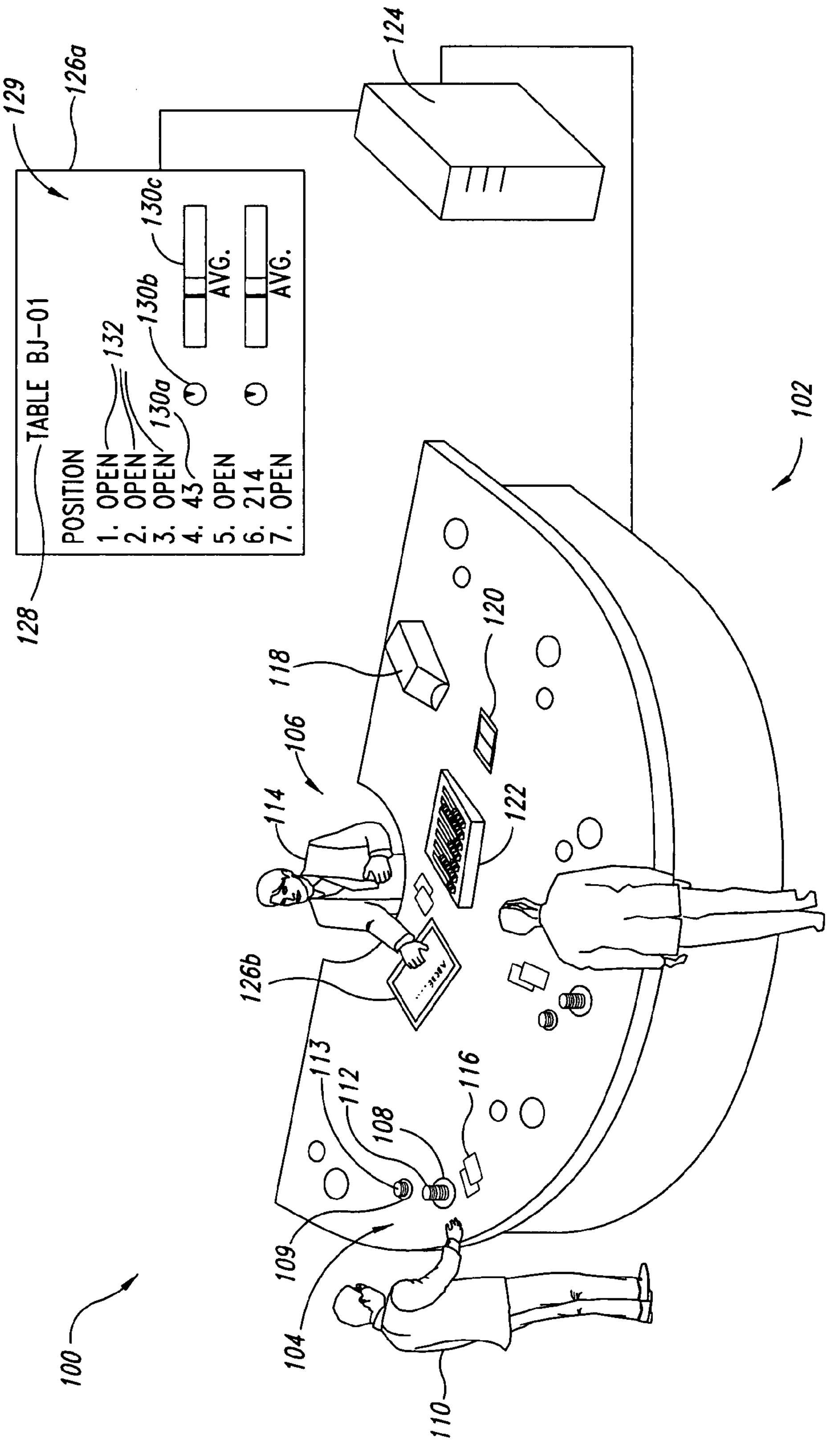
FIG. 1 is a schematic view of a gaming environment, including a gaming table, a host computing system, and at least one display visible to a number of participants, according to one illustrated embodiment.

FIG. 1 shows a gaming environment 100 according one illustrated embodiment.

The gaming environment 100 includes one or more gaming tables 102 having a number of player positions 104 (only one called out in Figure) and a dealer position 106. The player positions 104 are typically associated with a wagering area demarcated on the playing surface of the gaming table 102 and commonly referred to as a betting circle 108 (only one called out in Figure). A player 110 (only one called out in Figure) places a conventional bet or wager on the outcome of the game being played by locating one or more chips 112 or other items of value in the betting circle 108. The player positions 104 may also be associated with a bonus wagering area demarcated on the playing surface of the gaming table 102, referred to herein as a bonus betting circle 109 (only one called out in Figure). A player 110 places a bonus bet or bonus wager by locating one or more chips 113 or other items of value in the bonus betting circle 109.

A dealer 114 deals playing cards 116 to the players 110. In some games, the dealer 114 may deal playing cards to the dealer's own self. The dealer 114 may deal playing cards 116 from a handheld deck or from a card shoe 118. The dealer 114 may retrieve the playing cards 116 from a playing card handling system 120, for example, an automatic shuffling machine. The dealer 114 may load the retrieved playing cards 116 into the card shoe 118, if the card shoe 118 is present on the gaming table 102. The dealer 114 uses a chip tray 122 for storing wagers collected from losing players 110 and for paying out winnings to winning players 110.

The gaming environment 100 may also include a host computing system 124 and one or more displays 126*a*, 126*b* (collectively 126). The host computing system 124 is communicatively coupled to one or more systems and subsystems at the gaming table 102, and to the displays 126*a*, 126*b*. The host computing system 124 may, for example, control or provide information to the display 126*a*, 126*b* for displaying information about the game being played at the gaming table 102. For example, the host computing system 124 can cause the displays 126*a*, 126*b* to display a table identifier 128 that identifies the gaming table 102. The host computing system 124 may also display information about the various player positions 104. For example, the host computing system 124 can cause the display 126*a*, 126*b* to display a user interface 129 showing information 130*a*-130*c* (generically 130) that is indicative of the chance or chances for a bonus payout for each of the players 110 or player positions 104. Additionally, or alternatively, the host computing system 124 can cause the display 126*a*, 126*b* to display a status indication of the player position 104. For example, the display 126*a*, 126*b* may display information 132 indicating that a player position 104 is open or is not currently open.

One or more of the displays 126*a* may be in the line-of-sight or otherwise visible from one or more of the player positions 104. One or more of the displays 126*b* may be in the line-of-sight or otherwise visible from the dealer position 106. Some embodiments may only include a display 126*b* visible from the dealer position 106, and may or may not include a shield or other features that prevent the players 110 from seeing the information displayed on the display 126*b* visible from the dealer position 106.

One or more displays may provide an input interface for the dealer 114. For example, the display 126*b* may take the form of a touch sensitive display, presenting a graphical user interface (GUI) with one or more user selectable icons. The display 126*b* may be positioned within reach (e.g., within approximately 3 feet) of the dealer position 106.

The display 126*b* may allow the dealer 114 to enter bonus related, odds related or other information for each of the respective players 110 or player positions 104. For example, the dealer 114 may enter payout or house odds, such as standard blackjack payout or house odds 3:2 for player position 6, while entering non-standard blackjack payout or house odds (e.g., 5:1) for the fourth player position. Additionally or alternatively, the dealer 114 may enter information indicative of whether the player 110 or player position will participate in a bonus pool. For example, such information may indicate whether the player 110 has placed a bonus wager 113 at the bonus betting circle 109 of the player position 104, and/or size of such a bonus wager. The bonus wager 113 is in addition to a conventional wager 112 on the outcome of the game being played at the gaming table 102 under the standard rules of the game, and entitles the player 110 to participate in award of a bonus pool. In some embodiments, placement of the conventional wager 112 will entitle the player 110 to participate in the bonus pool. Additionally or alternatively, the dealer 114 may enter information indicative of the skill level of the player 110. For example the dealer 114 may enter information based on manual observation and indicative of how well the player 110 plays basic strategy, whether the player appears to be employing a counting scheme and/or is achieving results that are below or above the theoretical odds for the game and hence reflective of a theoretical advantage.

Figure 2:
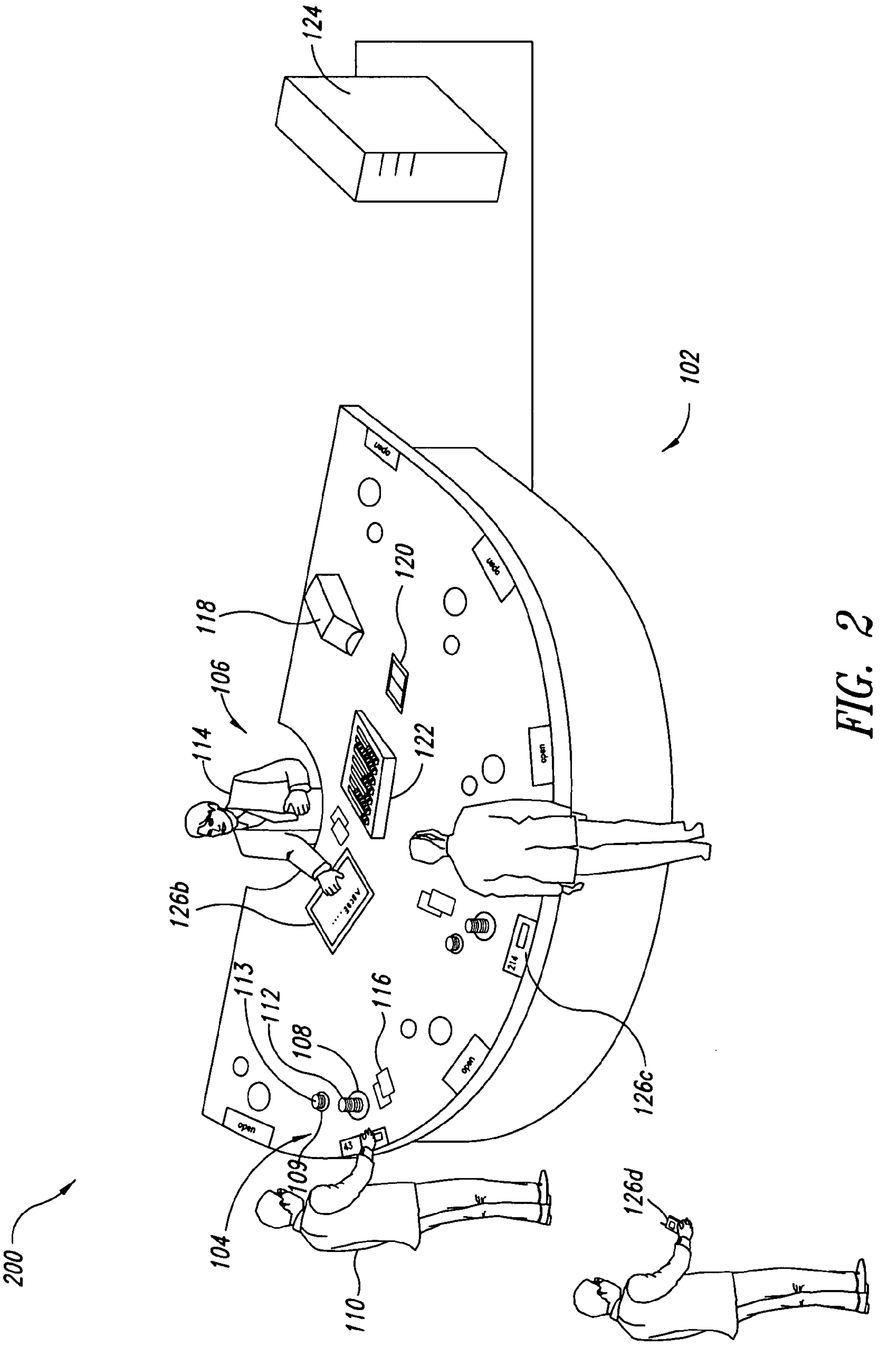
FIG. 2 is a schematic diagram of a gaming environment, including a gaming table, computing system, and a plurality of touch screen displays proximate a number of player positions as well as a display on a handheld communications device, according to one illustrated embodiment.

FIG. 2 shows a gaming environment 200 according to another illustrated embodiment. This embodiment and other embodiments described herein are substantially similar to the previously described embodiment, and common acts and structures are identified by the same references. Only significant differences in operation and structure are described below.

In the embodiment illustrated in FIG. 2, displays 126*c* (only one called in the Figure) is positioned proximate respective ones of the player positions 104. Additionally, or alternatively, displays 126*d* may be carried or otherwise associated with one or more communications devices, for example handheld wireless communications devices such as personal digital assistants (PDAs), BLACKBERRY® or TREO® type devices, and/or cellular phones. The host computing system 124 can cause the displays 126*c*, 126*d* to display information regarding the game. In particular, the host computing system 124 can cause the displays 126*c*, 126*d* to display information regarding all of the player positions 104. Alternatively, the host computing system 124 can cause the displays 126*c*, 126*d* to display information regarding only the respective player position 104 to which the display 126*c*, 126*d* is proximate or held by. The information may, for example include information indicative of payout or house odds. The information may additionally or alternatively include information indicative of qualification for the bonus pool, chances or odds at the bonus pool, size of the bonus pool, total number of players qualified for the bonus pool, time remaining to qualify for the bonus pool, time remaining before the award of the bonus pool, etc.

The displays 126*c*, 126*d* may take the form of touch screen displays presenting a GUI with user selectable icons. The user selectable icons may allow the players 110 enter a variety of information and make selections. For example, the user selectable icons may allow a player 110 to select payout or house odds for a particular hand or game. The user selectable icons may allow the player 110 to select between a set of predefined house odds (e.g., 1:1, 2:1, 3:1, . . . , 100:1, . . . , 1000:1, etc.) or may permit the user to enter a user defined set of payout or house odds. Also for example, the user selectable icons may allow a player 110 to select to participate in one or more bonus pools. Alternatively, or additionally, other user input devices may be employed, for example, keypads and/or keyboards. The user selected house odds and/or information related to participation in a bonus pool may be displayed on the display 126*b* viewable by the dealer 114. In other embodiments, the payout or house odds and/or information related to participation in a bonus pool may be kept secret from the dealer 114 as well as from the other players 110.

Figure 3:
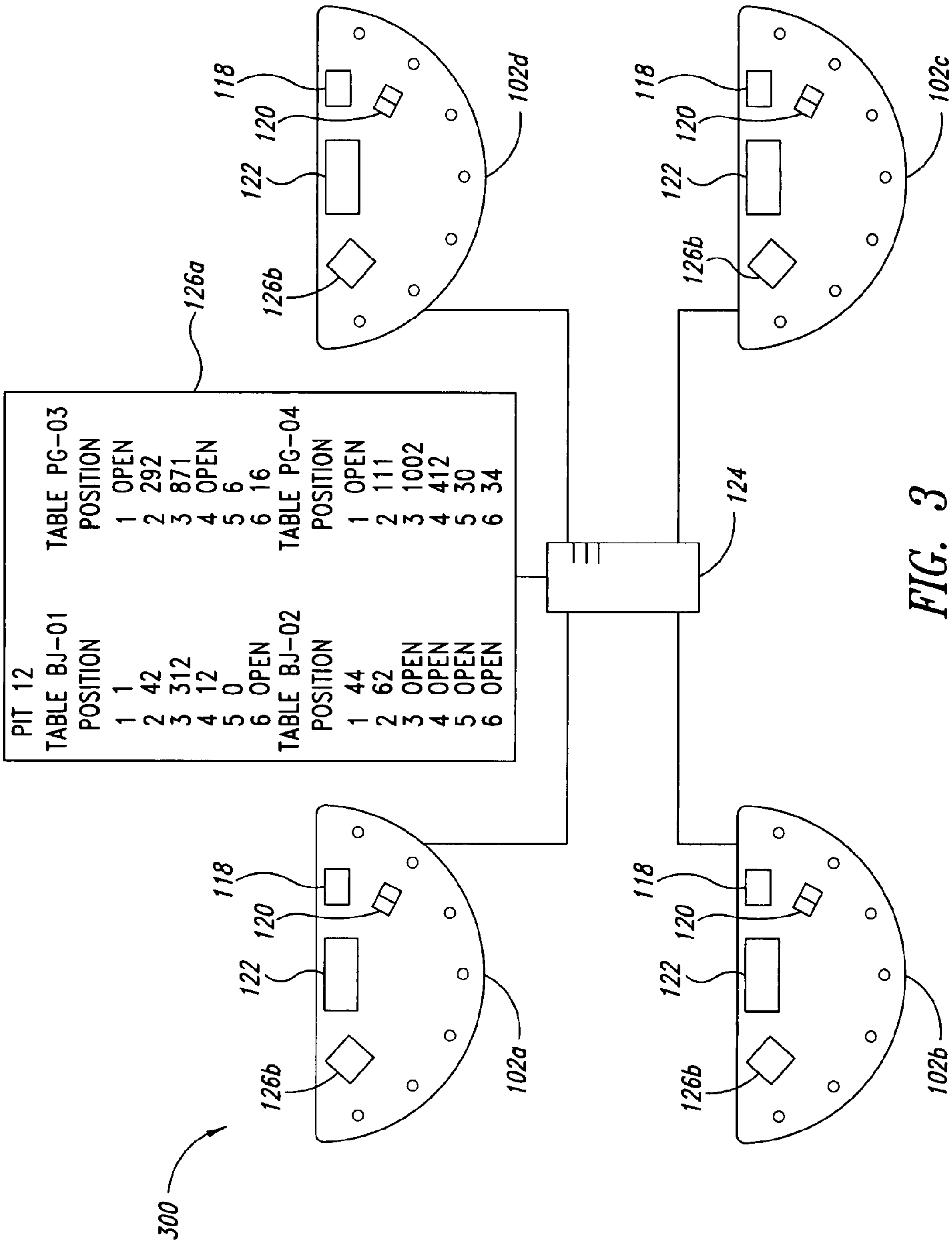
FIG. 3 is a schematic diagram of a gaming environment, including a number of gaming tables associated with or constituting a gaming pit, a computing system, and at least one display visible to a number of participants, according to another illustrated embodiment.

FIG. 3 shows a gaming environment 300, according to one illustrated embodiment. The gaming environment 300 takes the form of a pit, including a plurality (e.g., four) of gaming tables 102*a*-102*d* communicatively coupled to the display 126*a* via the host computing system 124. The display 126*a* may be viewable by some or all of the players 110 at the various gaming tables 102*a*-102*d*. The displays 126*a* may be viewable by other patrons of the casino. Such may advantageously create excitement amongst the patrons. Such also advantageously allows pit bosses or other casino personnel to easily keep track of the payout or house odds and/or bonus pool participation selected by the players 110 in the various player positions 104 at multiple tables. The pit bosses or other casino personnel may quickly and easily discern suspect or extraordinarily high payout or house odds selections or bonus pool participation. The pit bosses or other casino personnel may also discern a skill level of the player 110 via manual observation. Additionally, or alternatively, the host computing system 124 may provide a notification (e.g., audible and/or visual) to casino security personnel.

Figure 4:
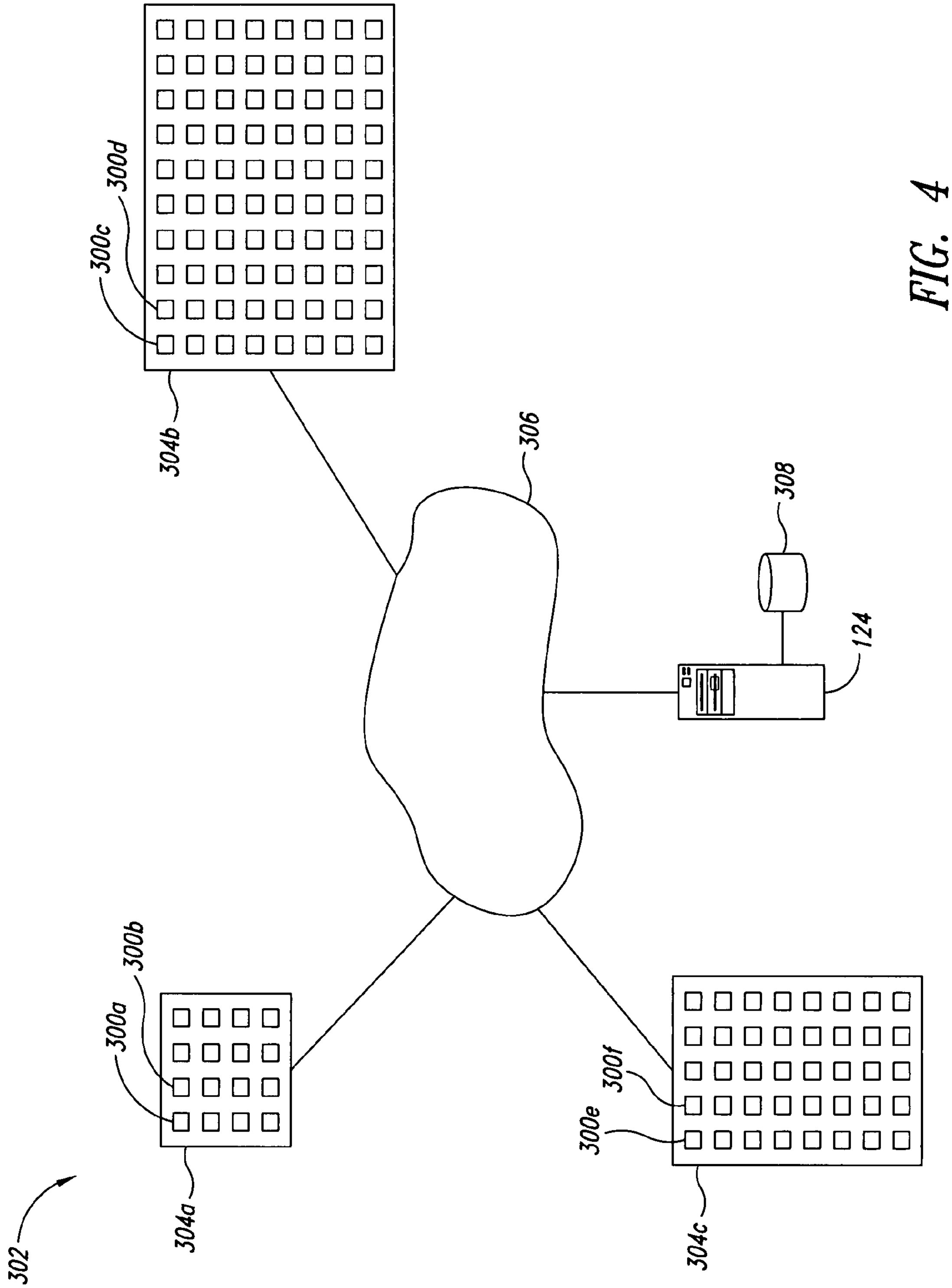
FIG. 4 is a schematic diagram of a gaming environment, including a number of properties each including a plurality of gaming pits with one or more gaming tables, a computing system, and a network communicatively coupling the computing system with the properties, according to another illustrated embodiment.

FIG. 4 shows a multi-property gaming environment 302 according to one illustrated embodiment. The multi-property gaming environment includes two or more properties 304*a*-304*c* (collectively 304). The properties 304 may be distinct locations, for example distinct casinos. One or more of the properties 304 may be commonly owned by a single business entity or may be commonly owned by multiple business entities. Additionally, or alternatively, the some or all of the properties 304 may be separately owned by distinct business entities. One or more of the properties 304 may be located in the same city, town, county, state or country. Additionally, or alternatively, one or more of the properties 304 may be located in different cities, towns, countries or states or countries.

Each property 304 may include one or more pits 300*a*-300*f* (only six called out in FIG. 4), which may include one or more gaming tables 102. The pits 300*a*-300*f* may, for example take a form similar to that shown in FIG. 3.

The properties 304 are communicatively linked by one or more networks 306, host computing system 124 and associated memory 308 storing instructions and a database. The network(s) 306 may take the form of local area networks (LANs), wide area networks (WANs) or other networks. The network(s) 306 may include wired and/or wireless communications links. The networks(s) 306 may include digital and/or analog communications links. The network(s) 306 may employ other networking technologies, some of which are discussed in more detail herein.

The memory 308 may store instructions for operating the gaming environment 302, along with a database populated with information related to bonus wagers, chances at a bonus pool as well as the bonus pool itself. For example, the database may reflect a total number of chances provided to respective players 110 for a bonus pool. Each of the chances may, for example, reflect a single chance or opportunity to participate in the bonus pool. As such, the chances may be virtual (i.e., computer data). For example, a player 110 may be provided with zero, one or more chances to participate or win all or a portion of a bonus pool. Such may be implemented in a fashion similar to a lottery, with each chance have the same probability of winning as each other chance. The total number of chances for a given bonus pool may be variable, or may be fixed. As discussed below, the chances may be provided based on one or more of a variety of factors. Also for example, the database may reflect a total amount of a bonus pool. The database may reflect amounts contributed by individual players either via conventional wagers or bonus wagers. The database may reflect amounts contributed by individual gaming tables 102, individual pits 300, individual properties 304, individual business entities such as the casinos or other corporate of business sponsors (e.g., advertisers) and/or a consortium of property owners or casinos.

Discussion of Suitable Computing Environment

Figure 5:
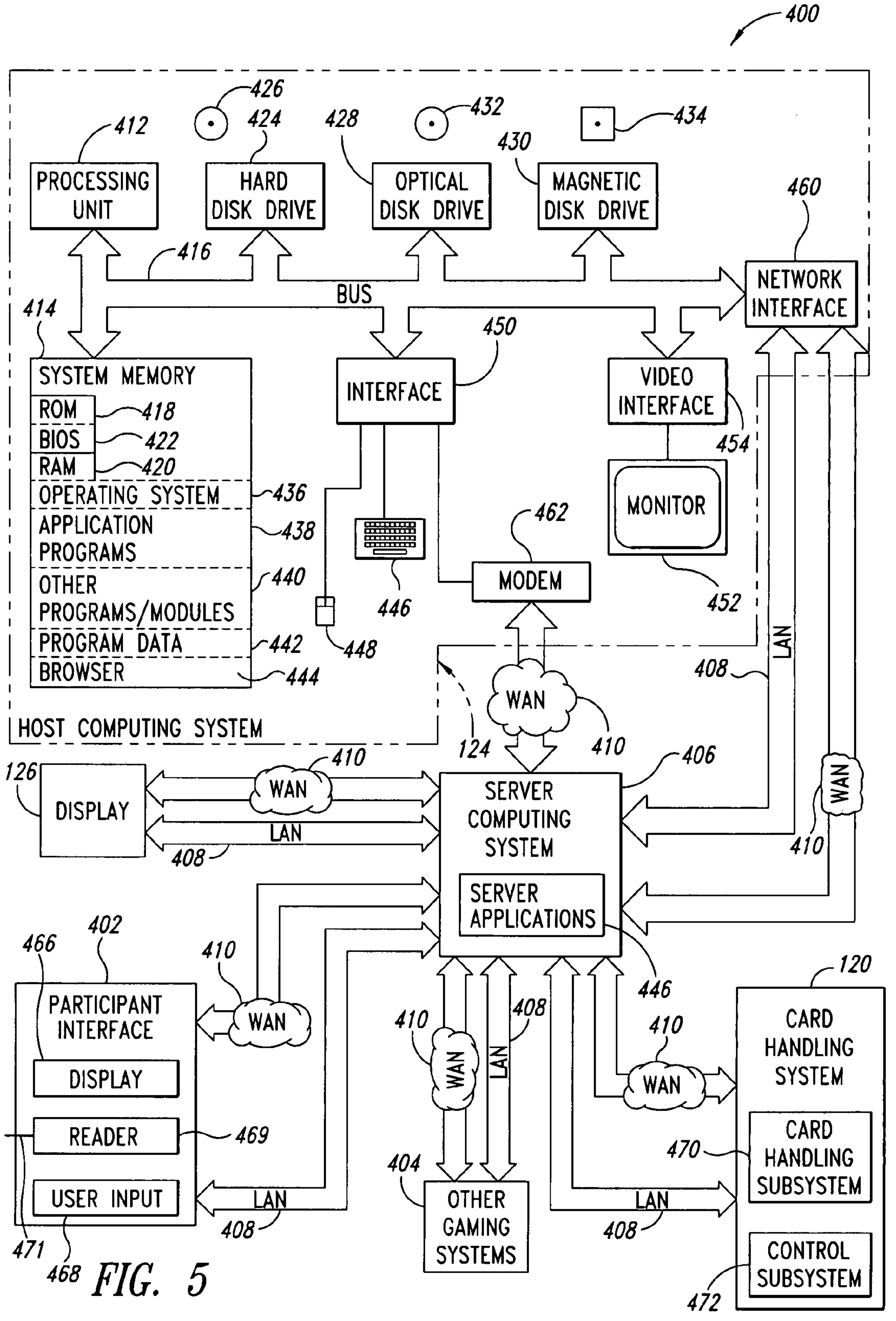
FIG. 5 is a schematic diagram of a gaming system, including a host computing system, gaming table system, participant interface, other gaming systems, and server computing system communicatively coupling at least some of the other elements, according to one illustrated embodiment.

FIG. 5 and the following discussion provide a brief, general description of a suitable gaming system environment 400 in which the various illustrated embodiments can be implemented. Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 5 shows the gaming system environment 400 comprising one or more host computing systems 124, displays

126, participant interfaces 402, playing card handling systems 120, other gaming systems 404, and/or server computing systems 406 coupled by one or more communications channels, for example one or more local area networks (LANs) 408 or wide area networks (WANs) 410. The gaming system environment 400 may employ other computers, such as conventional personal computers, where the size or scale of the system allows.

The host computing system 124 may take the form of a conventional mainframe or mini-computer, that includes a processing unit 412, a system memory 414 and a system bus 416 that couples various system components including the system memory 414 to the processing unit 412. The host computing system 124 will at times be referred to in the singular herein, but this is not intended to limit the embodiments to a single host computing system since in typical embodiments, there will be more than one host computing system or other device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 412 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 5 are of conventional design. As a result, such blocks need not be described in further detail herein, as they will be understood by those skilled in the relevant art.

The system bus 416 can employ any known bus structures or architectures, including a memory bus with memory controller, a peripheral bus, and a local bus. The system memory 414 includes read-only memory ("ROM") 418 and random access memory ("RAM") 420. A basic input/output system ("BIOS") 422, which can form part of the ROM 418, contains basic routines that help transfer information between elements within the host computing system 124, such as during start-up.

The host computing system 124 also includes a hard disk drive 424 for reading from and writing to a hard disk 426, and an optical disk drive 428 and a magnetic disk drive 430 for reading from and writing to removable optical disks 432 and magnetic disks 434, respectively. The optical disk 432 can be a CD-ROM, while the magnetic disk 434 can be a magnetic floppy disk or diskette. The hard disk drive 424, optical disk drive 428 and magnetic disk drive 430 communicate with the processing unit 412 via the system bus 416. The hard disk drive 424, optical disk drive 428 and magnetic disk drive 430 may include interfaces or controllers (not shown) coupled between such drives and the system bus 416, as is known by those skilled in the relevant art. The drives 424, 428 and 430, and their associated computer-readable media 426, 432, 434, provide nonvolatile storage of computer readable instructions, data structures, program modules and other data for the host computing system 124. Although the depicted host computing system 124 employs hard disk 424, optical disk 428 and magnetic disk 430, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 414, such as an operating system 436, one or more application programs 438, other programs or modules 440 and program data 442. The system memory 414 may also include communications programs for example a Web client or browser 444 for permitting the host computing system 124 to access and exchange data with sources such as Web sites of the Internet, corporate intranets, or other networks as described below, as well as other server applications on server computing systems such as those discussed further below. The browser 444 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from America Online and Microsoft of Redmond, Wash.

While shown in FIG. 5 as being stored in the system memory 414, the operating system 436, application programs 438, other programs/modules 440, program data 442 and browser 444 can be stored on the hard disk 426 of the hard disk drive 424, the optical disk 432 of the optical disk drive 428 and/or the magnetic disk 434 of the magnetic disk drive 430. An operator, such as casino personnel, can enter commands and information into the host computing system 124 through input devices such as a touch screen or keyboard 446 and/or a pointing device such as a mouse 448. Other input devices can include a microphone, joystick, game pad, tablet, scanner, etc. These and other input devices are connected to the processing unit 412 through an interface 450 such as a serial port interface that couples to the system bus 416, although other interfaces such as a parallel port, a game port or a wireless interface or a universal serial bus ("USB") can be used. A monitor 452 or other display device is coupled to the system bus 416 via a video interface 454, such as a video adapter. The host computing system 124 can include other output devices, such as speakers, printers, etc.

The host computing system 124 can operate in a networked environment using logical connections to one or more remote computers and/or devices, for example the server computing system 406. The server computing system 406 can be another personal computer, a server, another type of computer, or a collection of more than one computer communicatively linked together and typically includes many or all of the elements described above for the host computing system 124. The server computing system 406 is logically connected to one or more of the host computing systems 124 under any known method of permitting computers to communicate, such as through one or more LANs 408 and/or WANs 410 such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a LAN networking environment, the host computing system 124 is connected to the LAN 408 through an adapter or network interface 460 (communicatively linked to the system bus 416). When used in a WAN networking environment, the host computing system 124 may include a modem 462 or other device, such as the network interface 460, for establishing communications over the WAN 410. The modem 462 is shown in FIG. 5 as communicatively linked between the interface 450 and the WAN 410. In a networked environment, program modules, application programs, or data, or portions thereof, can be stored in the server computing system 406. In the depicted embodiment, the host computing system 124 is communicatively linked to the server computing system 406 through the LANs 408 and/or WAN 410, for example with TCP/IP middle layer network protocols. However, other similar network protocol layers are used in other embodiments, such as User Datagram Protocol ("UDP"). Those skilled in the relevant art will readily recognize that the network connections shown in FIG. 5 are only some examples of establishing communication links between computers, and other links may be used, including wireless links.

The server computing system 406 is also communicatively linked to one or more other computing systems or devices, such as the display 126, participant interface 402, playing card handling system 120 and/or other gaming systems 404, typically through the LAN 408 or the WAN 410 or other networking configuration such as a direct asynchronous connection (not shown).

The server computing system 406 includes server applications 464 for the routing of instructions, programs, data and agents between the host computing system 124, display 126, playing card handling system 120, participant interface 402, and/or other gaming systems 404. For example the server applications 464 may include conventional server applications such as WINDOWS NT 4.0 Server, and/or WINDOWS 2000 Server, available from Microsoft Corporation or Redmond, Wash. Additionally, or alternatively, the server applications 464 can include any of a number of commercially available Web servers, such as INTERNET INFORMATION SERVICE from Microsoft Corporation and/or IPLANET from Netscape.

The server computing system 406 may also include one or more random number generators. The random number generator may be implemented as a dedicated device, or alternatively, the random number generator functionality may be implemented as instructions executed by a processor. The random number generator may be used to select one or more winners of a bonus from a plurality of chances.

The participant interface 402 may include one or more displays 466 and user input devices 468. The participant interface 402 may take the form of one or more of the displays 126*b*, 126*c*, 126*d* (FIGS. 1, 2). As discussed above, the displays 126 may take the form of touch screen displays. Alternatively, or additionally, the participant interface 402 may employ a separate user input device, for example a keyboard or keypad. The participant interface 402 may further include one or more sound transducers, such as a speaker and/or microphone.

The participant interface 402 may include one or more readers 469 operable to read player identification information from one or more player identification media (e.g., player club card) 471. For example, the readers 469 may take the form of one or more magnetic stripe readers operable to read player identification information encoded into one or more magnetic stripes. Alternatively, or additionally, the readers 469 may take the form of one or more optical machine-readable symbol readers operable to read player identification information encoded into one or more machine-readable symbols (e.g., barcode symbols, stacked code symbols, area or matrix code symbols). For example, the readers 469 may take the form of one or more RFID readers or interrogators operable to read player identification information encoded into one or more RFID carriers (e.g., tags or cards).

The participant interface 402 may include one or more controllers, memories and may store and execute one or more applications for providing information to, and collecting information from the participants 110, 114 (FIGS. 1 and 2). For example, the players 110 may select payout or house odds and/or house advantage via the participant interface 402, for example via a GUI. The participant interface 402 may provide the player 110 with a selection of predefined payout or house odds and/or house advantages, or may receive payout or house odds and/or house advantage defined by the player 110. The participant interface 402 may permit the players 110 to select from a variety of bonus gaming options. Likewise, the participant interface 402 may provide the dealer 114 with the selected payout or house odds and/or house advantage for the various players 110, and may permit the dealer to enter the payout or house odds or house advantage for the various player positions 104. The participant interface 402 may provide the player 110 and/or dealer 114 with information regarding the player's 110 opportunity to participate in a bonus pool. For example, the information may include the player's absolute number of chances, relative chances, size of bonus pool, and time remaining to qualify for the bonus pool and/or factors to enhance the player's 110 opportunity to participate in the bonus pool.

Additionally, the participant interface 402 may include instructions for handling security such as password or other access protection and communications encryption. The participant interface 402 can also provide statistics (win, loss, time, etc.) to the players 110 and/or dealer 114. The statistics may be provided in real-time or almost real-time. Further, the participant interface 402 may allow the player 110 to request drinks, food, and/or services. The participant interface 402 may allow the dealer 114 to request assistance, for example requesting more chips or new playing cards. Other information may include one or more of player identification data, preference data, statistical data for the particular player and/or other players, account numbers, account balances, maximum and/or minimum wagers, etc.

The gaming system environment 400 may employ various playing card handling systems 120, and may include one or more playing card handling subsystems 470 and one or more controller subsystems 472, which may include one or more programmed microprocessors, application specific integrated circuits (ASICs), memories or the like. Playing card handling systems 120 may, for example, detect an order in which playing card are dealt. Playing card handling systems 120 may, for example, employ means for mechanical randomizing or ordering playing cards. The playing cards may have conventional markings (e.g., ranks 2-ACE and suits of Spades, Hearts, Clubs and Diamonds) or unconventional markings (e.g., slot machine symbols such as lemons, cherries, etc.), and/or special bonus cards). Playing card handling systems 120 may for example, computationally determine an order (e.g., randomized, sorted, etc.) in which playing cards will be dealt, and may provide the playing cards in the determined order. For example, such playing card handling systems 120 may employ mechanical means to physically arrange or provide the playing cards in the computationally generated order. Such mechanical means may, for example, include one or more playing card receivers such as carousels, stacks of compartments, elevators, pickers, ejectors, grippers, etc. Also for example, playing card handling systems 120 may employ indicia forming means for forming playing card markings on playing card media to provide the playing cards in the computationally generated order. Such indicia forming means may, for example, take the form of one or more print heads operable to print one or more playing card markings (e.g., rank and/or suit) on playing card media in the computationally defined order. The print head can take any of a variety of forms, such as a thermal print head, ink jet print head, electrostatic print head, or impact print head. In other embodiments, the indicia forming means may take the form of a magnetic write head, similar to those employed to encode information into magnetic stripes. In other embodiments, the indicia forming means may take the form of an inductive write head, a radio frequency transmitter, or transmitter of other frequencies of electro-magnetic radiation, including but not limited to optical magnetic radiation (e.g., visible light, ultraviolet light, and/or infrared light).

In some embodiments, the playing card media takes the form of playing card blanks without any markings. In other embodiments, the playing card media takes the form of playing card blanks with some playing card designs, but without playing card value markings (e.g., rank and/or suit symbols). Thus, the playing media may include identical ornamental designs on the backs of the playing card blanks, with the faces left blank for the playing card value markings. In still other embodiments, the playing card media may take the form of existing playing cards, from which the playing card value markings will be erased, prior to being reformed or otherwise generated. In some embodiments, the playing card media may take the form of a fiber based media, for example card stock, vellum, or polymer based media. In some embodiments, the playing card media takes the form of an active media, for example a form of electronic or "e-paper", smart paper, organic light emitting diodes, and/or ink code, which allows the formation and erasure of markings via electrical, magnetic, or electromagnetic radiation. Smart paper is a product developed by Xerox Palo Alto Research Center, of Palo Alto, Calif. The smart paper consists of a flexible polymer containing millions of small balls and electronic circuitry. Each ball has a portion of a first color and a portion of a second color, each portion having an opposite charge from the other portion. Applying a charge causes the balls to rotate within the polymer structure, to display either the first or the second color. Charges can be selectively applied to form different ones or groups of the balls to from the respective markings on the playing cards. The markings remain visible until another charge is applied. Alternatively, the playing card handling systems 120 can be adapted to employ color-changing inks such as thermochromatic inks (e.g., liquid crystal, leucodyes) which change color in response to temperature fluctuations, and photochromatic inks that respond to variations in UV light.

Some suitable playing card handling systems are discussed in detail in U.S. patent publication No. 2002-0187821 A published Dec. 12, 2002; U.S. Pat. No. 6,638,161 issued Oct. 28, 2003; U.S. patent publication No. 2004-0259618 A; U.S. patent application Ser. Nos. 11/352,416 filed Feb. 10, 2006, 11/428,249 filed Jun. 30, 2006, 11/428,258 filed Jun. 30, 2006, 11/428,286 filed Jun. 30, 2006, 11/428,253 filed Jun. 30, 2006, 11/428,240 filed Jun. 30, 2006, 11/480,321 filed Jun. 30, 2006, 11/480,349 filed Jun. 30, 2006, 11/479,930 filed Jun. 30, 2006, 11/480,273 filed Jun. 30, 2006, 11/480,345 filed Jun. 30, 2006, 11/480,295 filed Jun. 29, 2006, 11/478,360 filed Jun. 29, 2006, and 11/479,963 filed Jun. 29, 2006.

The other gaming systems 404 may include one or more sensors, detectors, input devices, output devices, actuators, and/or controllers such as programmed microprocessor, DSP, ASIC and/or Field Programmable Gate Array (FPGA) or the like. The controllers may execute one or more gaming applications. The gaming applications can include instructions for acquiring wagering and gaming event information from the live gaming at the gaming table 102 (FIGS. 1-4). The other gaming systems 404 may collect information via images (visible, infrared, ultraviolet), radio or microwave electromagnetic radiation, and/or by detecting magnetic, inductance, or mechanical energy. The other gaming systems 404 may, for example, employ optical machine-readable symbol readers, operable to read non-standard playing card markings from the playing cards, and/or identifiers from chips and/or player identification media such as casino club cards. Such markings or identifiers may, for example, take the form of machine-readable symbols such as barcode, matrix or area code, or stacked code symbols. Such optical machine-readable symbol readers may take the form of a scanner or an imager. The other gaming systems 404 may, for example, employ sensors operable to read standard playing card markings (e.g., rank, suit, pips). The other gaming systems 404 may, for example, employ one or more magnetic strip readers or inductive sensors to read magnetic stripe or other indicia carried on or in the playing cards, chips and/or player identification media. The other gaming systems 404 may, for example, employ one or more radio frequency readers, for example a radio frequency identification (RFID) interrogator where the playing cards, chips or player identification media carry RFID tags or circuits.

Such may be implemented in the card shoe 118, playing card handling system 120, dedicated discard shoe (not shown), chip tray 122, or other areas at or proximate the gaming table 102. For example, the other gaming systems 404 may acquire images of the wagers 112, 113 and/or identifiers on playing cards 116. The gaming applications can also include instructions for processing, at least partially, the acquired wagering and gaming event information, for example, identifying the position and amount of each wager 112, 113 and/or the value of each hand of playing cards. The gaming applications may include statistical packages for producing statistical information regarding the play at a particular gaming table, the performance of one or more players including indications of skill level, and/or the performance of the dealer 114 and/or game operator. The gaming applications can also include instructions for providing a video feed and/or simulation of some or all of the participant positions 104, 106. Gaming applications may determine, track, monitor or otherwise process outcomes of games, amounts of wagers 112, 113, average wager, player identity information, complimentary benefits information ("comps"), player performance data including indications of player skill or theoretical advantage or use of counting schemes, dealer performance data, chip tray accounting information, playing card sequences, etc. Some suitable applications are described in one or more of commonly assigned U.S. patent application: Ser. No. 60/442,368, filed Apr. 21, 1999; U.S. Pat. No. 6,460,848 issued Oct. 8, 2002; U.S. Pat. No. 6,652,379 issued Nov. 25, 2003, U.S. Pat. No. 6,685,568 issued Feb. 3, 2004; U.S. patent publication No. 2002-0187821 A published Dec. 12, 2002; U.S. Pat. No. 6,638,161 issued Oct. 28, 2003; and U.S. patent publication No. 2004-0259618 A.

Some embodiments may communicatively couple one or more of the systems 120, 124, 404, displays 126 and/or participant interfaces 402 without the use of the server computing system 406, or alternatively via multiple server computing systems.

Figure 6:
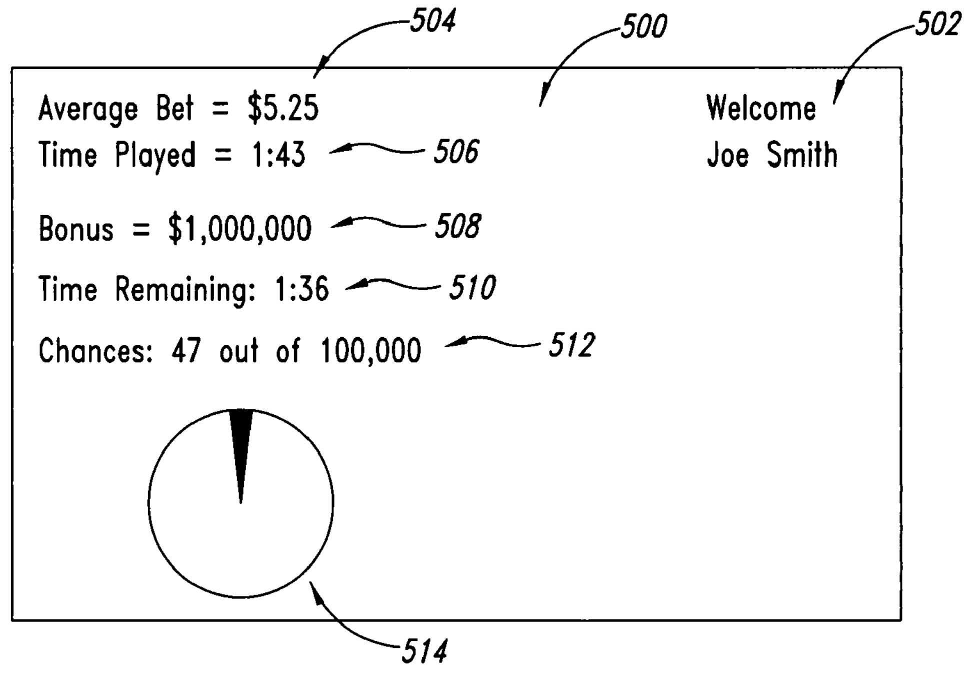
FIG. 6 is schematic diagram of a user interface showing a display of bonus related information, according to one illustrated embodiment.

FIG. 6 shows a user interface 500, according to one illustrated embodiment, displayable by 126*a*, 126*b*, 126*c*, 126*d* (FIGS. 1 and 2).

The user interface 500 shows bonus related information, which may be specific a single player 110. For example, the user interface 500 may show the identity 502 of the player 110. Also for example, the user interface 500 may show an average bet 504 placed by the player 110 during a given time period. Also for example, the user interface 500 may show an amount of time 506 the player 110 has been playing at the gaming table.

As another example, the user interface 500 may show an amount of the bonus 508. In some embodiments the amount of the bonus may be fixed, for example where the bonus is supplied by one or more casinos. In other embodiments the amount of the bonus changes over time, for example where the bonus is progressive. In such situations the user interface 500 changes the display of the amount of bonus 508 from time to time (e.g., periodically and/or when the underlying information changes).

As even another example, the user interface 500 may show a time remaining 510 to qualify for the bonus. For example, the time remaining may indicate the time in which to place a conventional wager 112 or a bonus wager 113. The time may be updated, and may for example, be displayed as a countdown or a count up.

As a further example, the user interface 500 may show a numerically stated indication 512 of the player's probability of winning the bonus and/or a graphical indication 514 of the player's probability of winning the bonus. The numerically stated indication 512 may, for example provide a numerical indication of the number of chances that have been provided or assigned to the player 110 and a numerical indication of the total number of chances eligible for the bonus. The graphical indication 514 may graphically represent the number of chances that have been provided or assigned to the player 110 relative to a graphical indication of the total number of chances eligible for the bonus. The graphical indication 514 can take a variety of forms, for example a graph (e.g., pie chart, bar chart, etc.).

While illustrated as specific to one player 110, alternatively, the display 126 may display the user interface 129 (FIG. 1) which shows bonus related information for multiple players 110.

Figure 7:
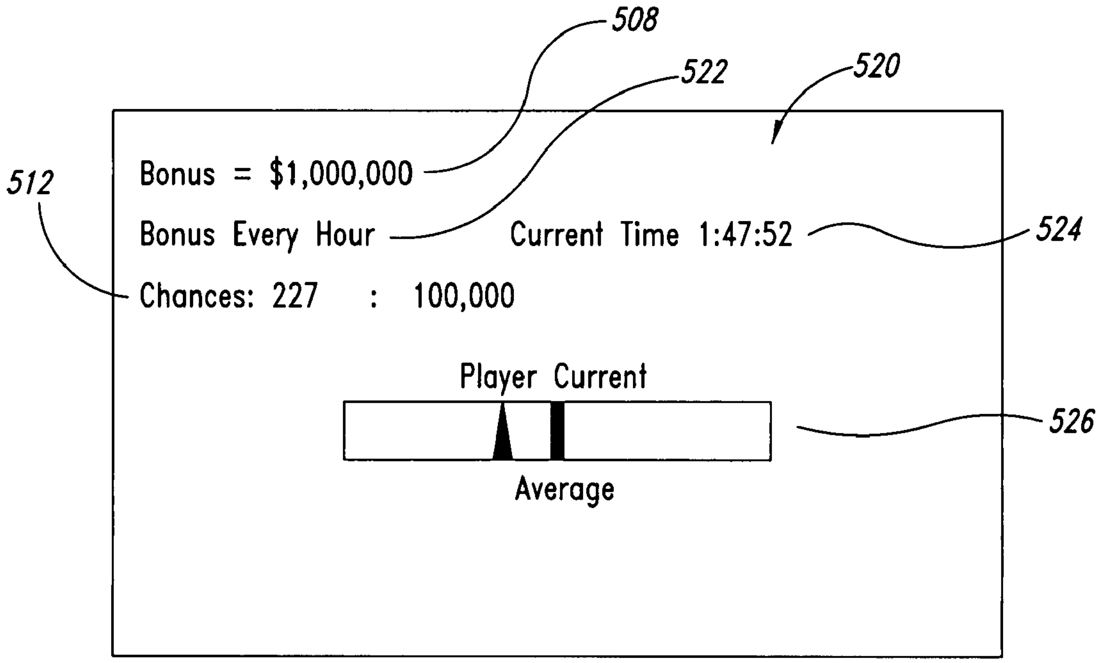
FIG. 7 is schematic diagram of a user interface showing a display of bonus related information, according to another illustrated embodiment.

FIG. 7 shows a user interface 520, according to another illustrated embodiment, displayable by 126*a*, 126*b*, 126*c*, 126*d* (FIGS. 1 and 2).

The user interface 520 shows bonus related information, which may be specific a single player 110. For example, the user interface 500 may show an amount of the bonus 508. As noted above, in some embodiments the amount of the bonus may be fixed, for example where the bonus is supplied by one or more casinos. In other embodiments the amount of the bonus changes over time, for example where the bonus is progressive. In such situations the user interface 520 changes the display of the amount of bonus 508 from time to time (e.g., periodically and/or when the underlying information changes).

As even another example, the user interface 520 may show a time 522 when the winner(s) of the bonus will be determined, for example once every hour or some other period. In such embodiments, the user interface 520 may also provide an indication of the current time 524.

As a further example, the user interface 520 may show a numerically stated indication 512 of the player's probability of winning the bonus and/or a graphical indication 526 of the player's probability of winning the bonus. As noted above, the numerically stated indication 512 may, for example provide a numerical indication of the number of chances that have been provided or assigned to the player 110 and a numerical indication of the total number of chances eligible for the bonus. The graphical indication 526 may graphically represent the number of chances that have been provided or assigned to the player 110 relative to a graphical indication of the total number of chances eligible for the bonus. The graphical indication 526 can take a variety of forms, for example a meter as illustrated in FIG. 7. The meter may reflect the average or mean number of chances or probability for all players, as well as the number of chances or probability for the specific player 110.

Figure 8:
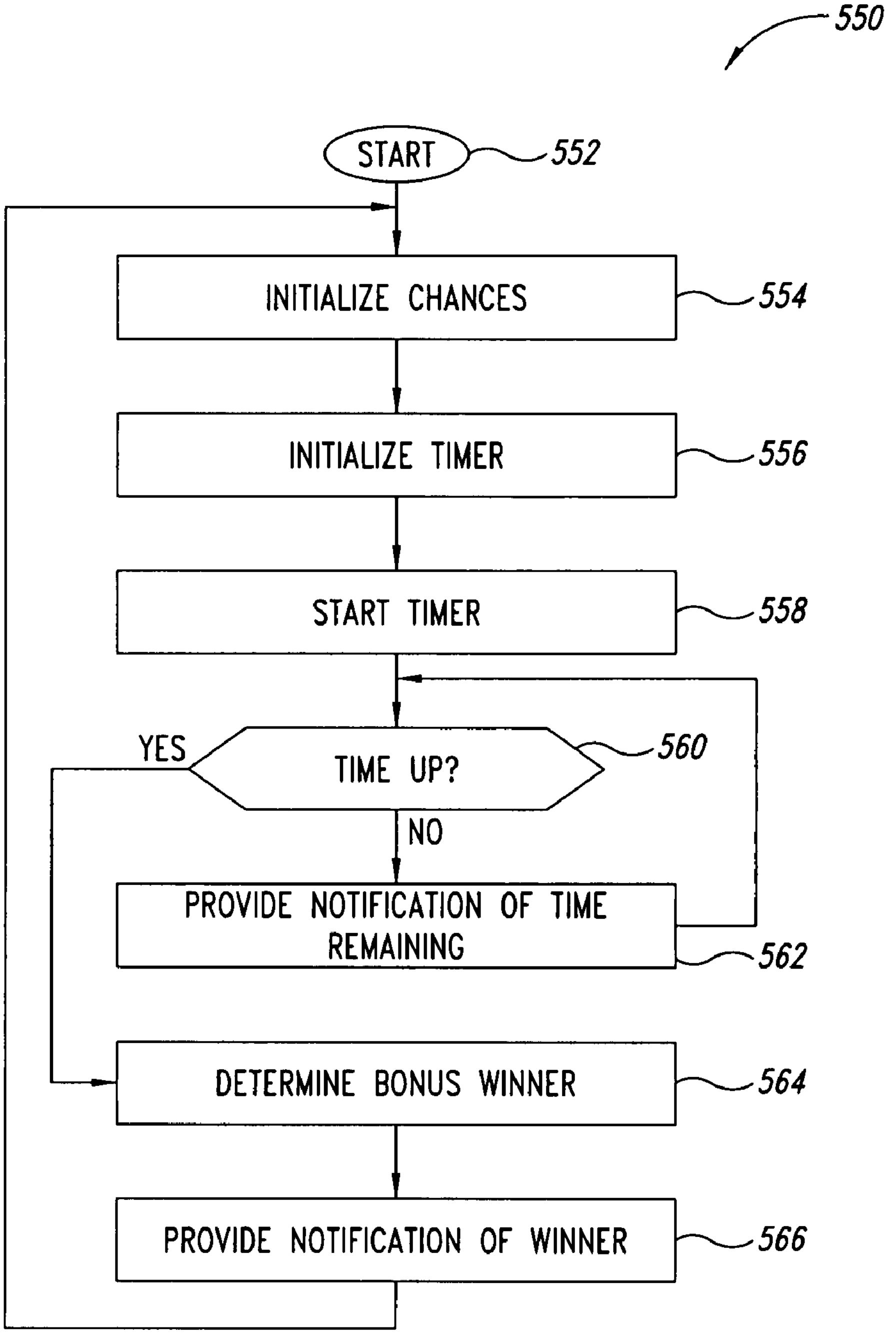
FIG. 8 is a flow diagram of a method of operating a gaming system environment according to one illustrated embodiment, in which bonuses are determined on a periodic basis.

FIG. 8 shows a method 550 of operating a gaming system environment 400, according to one illustrated embodiment.

The method 550 starts at 552. For example, the method 550 may start in response to the powering or turning ON of one or more components of the gaming system environment 400.

At 554, the host computing system 124 initializes the chances. For example, the host computing system 124 may set the chances for one or more players 110 to be zero or some other default value. At 556, the host computing system 124 initializes a timer. At 558, the host computing system 124 starts the timer.

At 560, the host computing system 124 determines whether a time period is up.

If the time period is not up, the host computing system 124 provides a notification of the time remaining in which to participate in a particular bonus. The host computing system 124 may provide the notification to the dealer 114 and/or one or more players 110. The host computing system 124 may provide the notification via one or more wired or wireless signals to one or more displays 126. The displays 126 may be fixed (e.g., stationary) or mobile (e.g., handheld or laptop wireless communications devices, such as personal digital assistants or cell phones). The host computing system 124 may provide the notification locally and/or remotely with respect to the gaming table 102 and/or property 304 (FIG. 4). The time remaining may be represented as a countdown clock or a count up clock (FIGS. 6 and 7). After providing notification, control returns to 560.

If the time is up, control passes to 564. At 564, the host computing system 124 determines one or more bonus winners, if any. The host computing system 124 may determine the bonus winner by randomly generating one or more values based on the chances. In some embodiments, the host computing system 124 may determine that there are no bonus winners. In such embodiments, the bonus or bonus pool may carried over to another round or game.

At 566, the host computing system 124 provides notification of the winner(s), if any. The host computing system 124 may provide notification to the dealer 114 and/or one or more players 110, as well as other casino personnel and/or authorities (e.g., governmental authorities). The host computing system 124 may provide notification via one or more wired or wireless signals to one or more displays 126. As noted above, the displays 126 may be fixed (e.g., stationary) or mobile (e.g., handheld or laptop wireless communications devices, such as personal digital assistants or cell phones). Also as noted above, the host computing system 124 may provide the notification locally and/or remotely with respect to the gaming table 102 and/or property 304 (FIG. 4).

The method 550 may repeat, operating as a continuous thread or process by passing control back to 554. Alternatively, the method 550 may terminate until called again by an appropriate signal.

Figure 9:
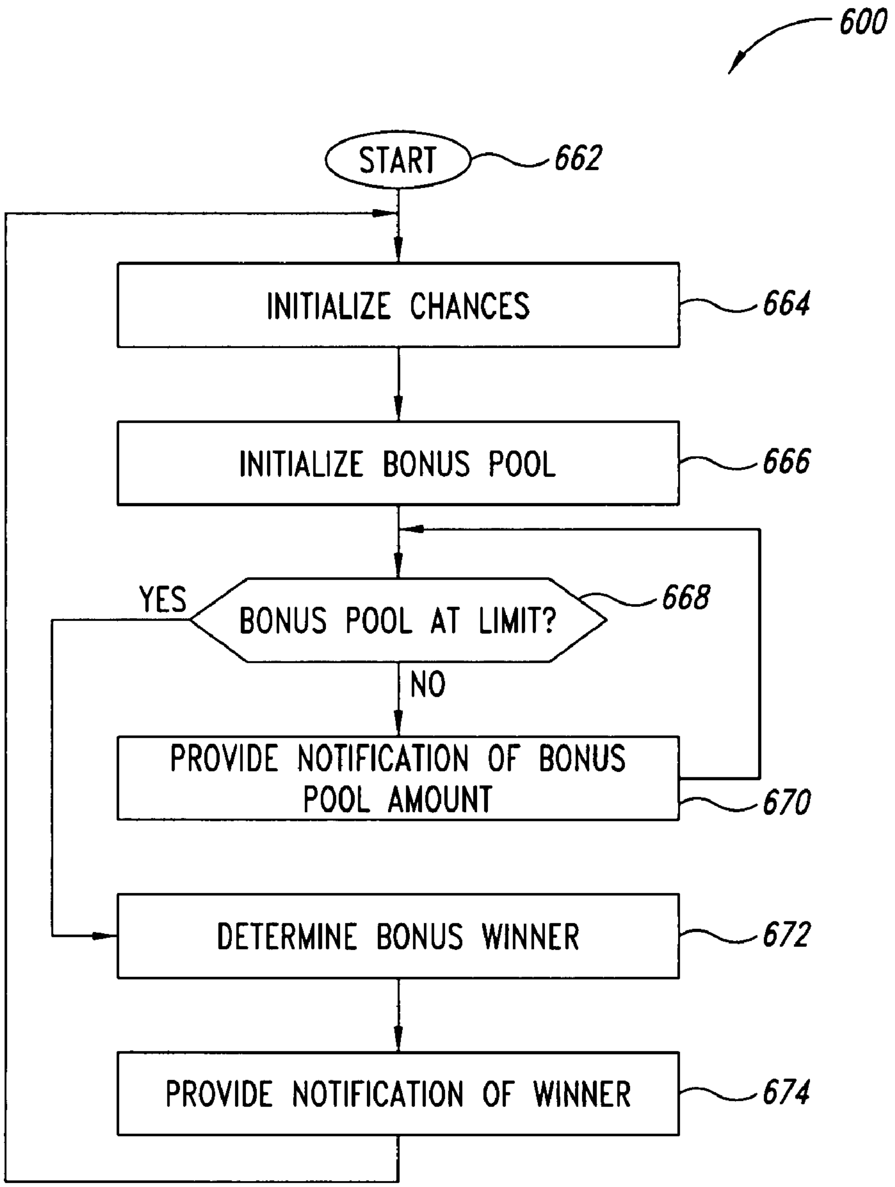
FIG. 9 is a flow diagram of a method of operating a gaming system environment according to another illustrated embodiment, in which bonuses are determined when a bonus pool reaches a defined amount.

FIG. 9 shows a method 600 of operating the gaming system environment 400 according to another illustrated embodiment in which bonuses are awarded when a bonus pool reaches a defined amount.

The method 600 starts at 662. For example, the method 600 may start in response to the powering or turning ON of one or more components of the gaming system environment 400.

At 664, the host computing system 124 initializes the chances. For example, the host computing system 124 may set the chances for one or more players 110 to be zero or some other default value. At 666, the host computing system 124 initializes the bonus pool. The host computing system 124 may initialize the bonus pool by setting the bonus pool to zero or to some default value. The default value may be indicative of a contribution by one or more of the business entities, for example, game operators, casinos and/or property owners.

At 668, the host computing system 124 determines whether the bonus pool is at least equal to the defined amount.

If the bonus pool is not at least equal to the defined amount, the host computing system 124 provides notification of the bonus pool amount at 670. The host computing system 124 may provide notification to the dealer 114 and/or one or more players 110, as well as other casino personnel and/or authorities (e.g., governmental authorities). The host computing system 124 may provide notification via one or more wired or wireless signals to one or more displays 126. As noted above, the displays 126 may be fixed (e.g., stationary) or mobile (e.g., handheld or laptop wireless communications devices, such as personal digital assistants or cell phones). Also as noted above, the host computing system 124 may provide the notification locally and/or remotely with respect to the gaming table 102 and/or property 304 (FIG. 4).

If the bonus pool is at least equal to the defined amount, control passes to 672. At 672, the host computing system 124 determines one or more bonus winners, if any. As discussed above, the host computing system 124 may determine the bonus winner by randomly generating one or more values based on the chances. In some embodiments, the host computing system 124 may determine that there are no bonus winners. In such embodiments, the bonus or bonus pool may carried over to another round.

At 674, the host computing system 124 provides notification of the winner(s), if any. The host computing system 124 may provide notification to the dealer 114 and/or one or more players 110, as well as other casino personnel and/or authorities (e.g., governmental authorities). The host computing system 124 may provide notification via one or more wired or wireless signals to one or more displays 126. As noted above, the displays 126 may be fixed (e.g., stationary) or mobile (e.g., handheld or laptop wireless communications devices, such as personal digital assistants or cell phones). Also as noted above, the host computing system 124 may provide the notification locally and/or remotely with respect to the gaming table 102 and/or property 304 (FIG. 4).

Figure 10:
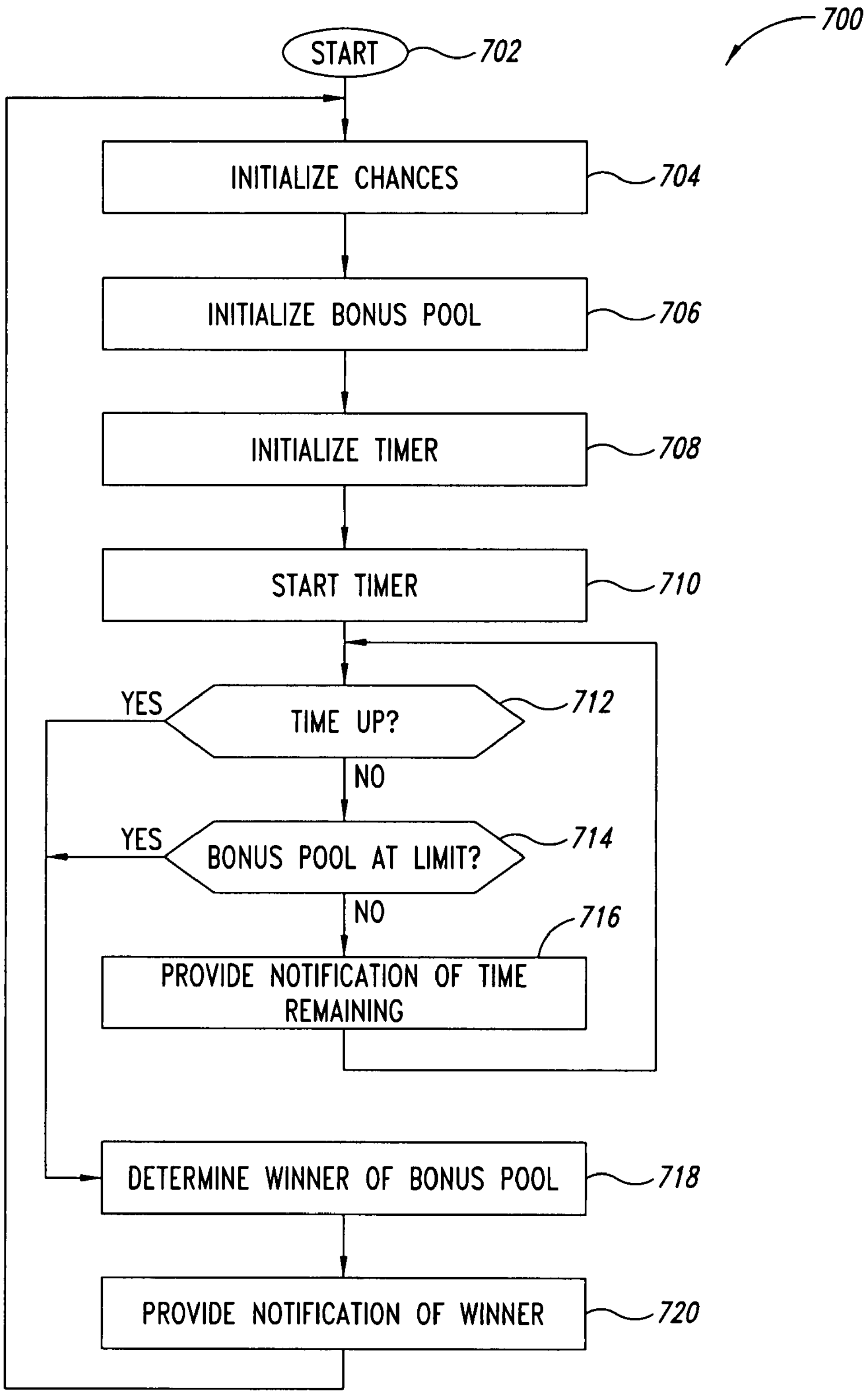
FIG. 10 is a flow diagram of a method of operating a gaming system environment according to yet another illustrated embodiment, in which bonuses are determined when a bonus pool reaches a defined amount or when a period ends, whichever event occurs first.

FIG. 10 shows a method 700 of operating the gaming system environment 400 according to another illustrated embodiment, employing both a timer and a bonus pool amount for determining when to award a bonus.

The method 700 starts at 702. For example, the method 700 may start in response to the powering or turning ON of one or more components of the gaming system environment 400.

At 704, the host computing system 124 initializes the chances. For example, the host computing system 124 may set the chances for one or more players 110 to be zero or some other default value. At 706, the host computing system 124 initializes the bonus pool. The host computing system 124 may initialize the bonus pool by setting the bonus pool to zero or to some default value. The default value may be indicative of a contribution by one or more of the business entities, for example, game operators, casinos and/or property owners. At 708, the host computing system 124 initializes the timer. At 710, the host computing system 124 starts the timer.

At 712, the host computing system 124 determines whether a time period is up.

If the time is not up, the host computing system 124 determines whether the bonus pool is at least equal to the defined amount at 714.

If the time is not up and the bonus pool has not reached the defined amount, the host computing system 124 provides notification of the time remaining. Such has been previously described in detail with reference to FIG. 9, and will not be repeated in the interest of brevity.

If either the time is up or the bonus pool has reached the limit, control passes to 718.

At 718, the host computing system 124 determines the winner of the bonus pool. Such has been previously described in detail with reference to FIGS. 8 and 9, and such discussion is not repeated in the interest of brevity.

At 720, the host computing system 124 provides notification of the winner. Such has been previously described in detail with reference to FIGS. 8 and 9 and is not repeated in the interest of brevity.

Figure 11:
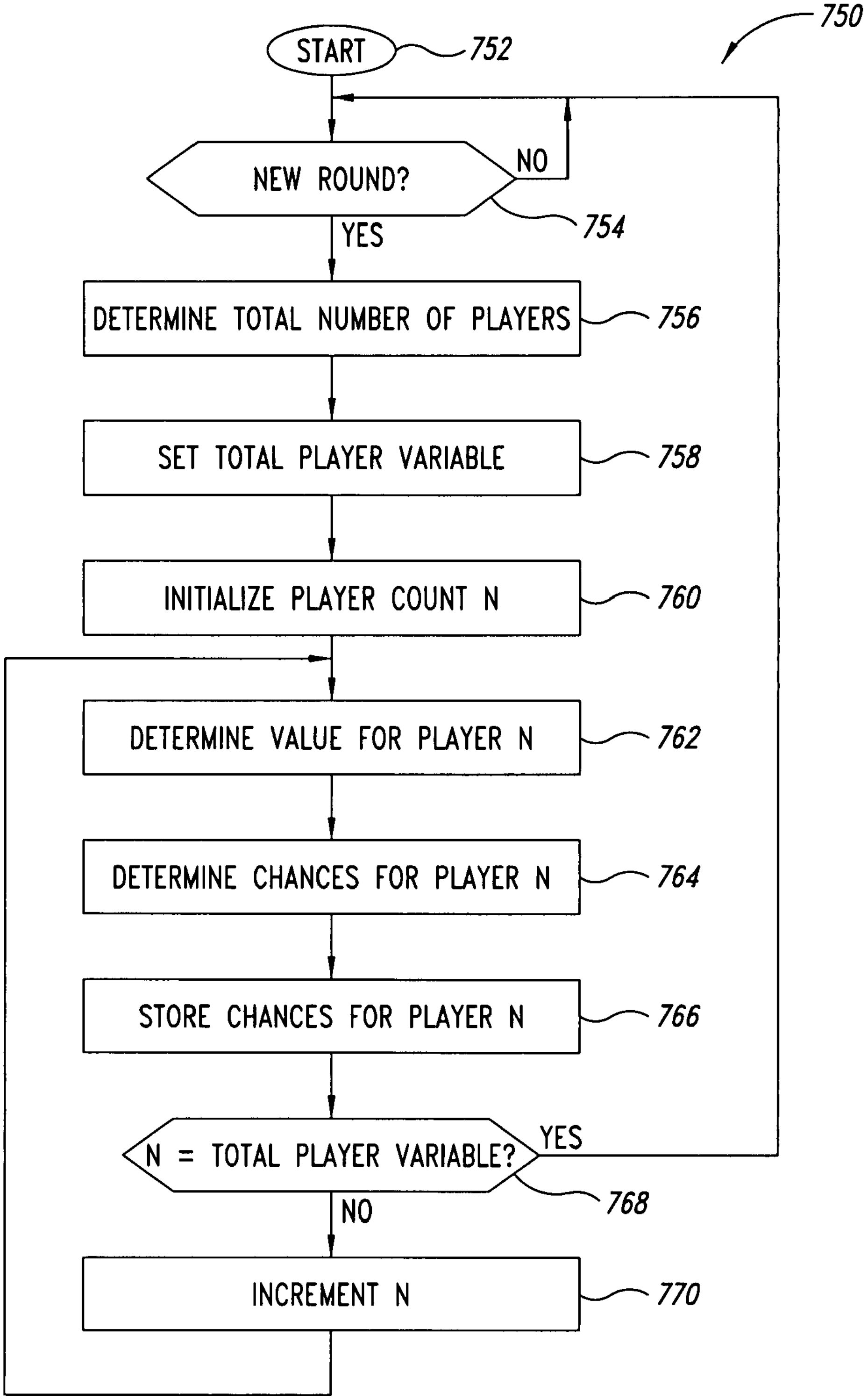
FIG. 11 is a flow diagram of a method of operating gaming system environment to provide or otherwise allocate chances at a bonus to players, according to one illustrated embodiment.

FIG. 11 shows a method 750 of operating the gaming system environment 400 to provide or otherwise allocate chances at a bonus to players, according to one illustrated embodiment.

The method 750 starts at 752. For example, the method 750 may start in response to one or more signals indicative of a new round of play. For example, the method 750 may start in response to a signal indicative of initial wagers 112, 113 being placed, and/or the dealing of cards 116 to one or more players 110.

At 754, the host computing system 124 determines whether a new game or round has started. If a new game or round has not started, the method 750 executes a wait loop, returning control back to 754. If a new round has started, control passes to 756.

At 756, the host computing system 124 determines the total number of players 110. The host computing system 124 may determine the total number of players 110 based on one or more signals received from one or more user interfaces, such as one associated with the display 126 (FIG. 1) or from a participant interface 402 (FIG. 5) or other gaming system 404 (FIG. 5). At 758, the host computing system 124 sets a total player variable to be indicative of the total number of players. At 760, the host computing system 124 initializes a player count N to initial value (e.g., 0 or 1).

At 762, the host computing system 124 determines a value for player N. The host computing system 124 may determine the value based on one or more factors such as total amount wagered, average amount wagered, time spent wagering, and/or skill level. At 764, the host computing system 124 determines, provides or otherwise allocates chances for the player N based on the determined value. The chances may take the form of one or more virtual values, each representing an opportunity to win the bonus. At 766, the host computing system 124 stores the determined chances for the player N.

At 768, the host computing system 124 determines if the player count N is equal to the total player variable. If not, the host computing system 124 increments the player count N at 770, and returns control to 762 to process the next player. If the player count N is equal to the total player variable, control returns to 754 to await the start of a new round or game.

Figure 12:
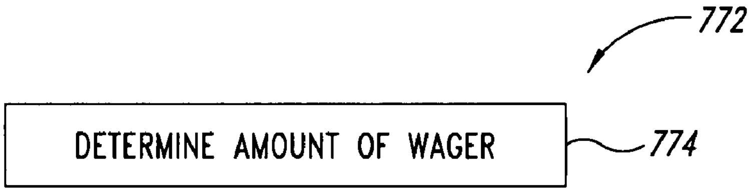
FIG. 12 is a flow diagram of a method of operating gaming system environment to determine a value for a player, according to one illustrated embodiment.

FIG. 12 shows a method 772 of determining a value for a player N, according to one illustrated embodiment. The method 772 may be suitable for use in the method 750 (FIG. 11).

At 774, the host computing system 124 determines an amount wagered by a player 110. For example, the host computing system 124 may receive one or more signals indicative of an amount wagered by a player 110 based on manual observations by the dealer 114 or other casino personnel (e.g., pit boss). Such manual observations may be collected on paper and entered converted into electronic form via scanning or typing. Such manual observations may be collected by keying into an electronic communications device, for example an handheld wireless communications device. Alternatively, or additionally, the host computing system 124 may receive one or more signals indicative of the amount wagered by a player 110 which are based on automatic detection and data collection by components of the gaming system environment 400 such as the participant interface 402, other gaming systems 404, and/or card handling system 120. For example, one or more imagers located proximate the gaming table, for example, in the chip tray 122, may capture images of the wagers 112, 113 placed by the players 110. Such images may be processed to determine the amount of wagered. Alternatively, one or more sensors such as inductive sensors, optical sensors, RF sensors with associated antennas may be determine the amount of wagered 112, 113.

Figure 13:
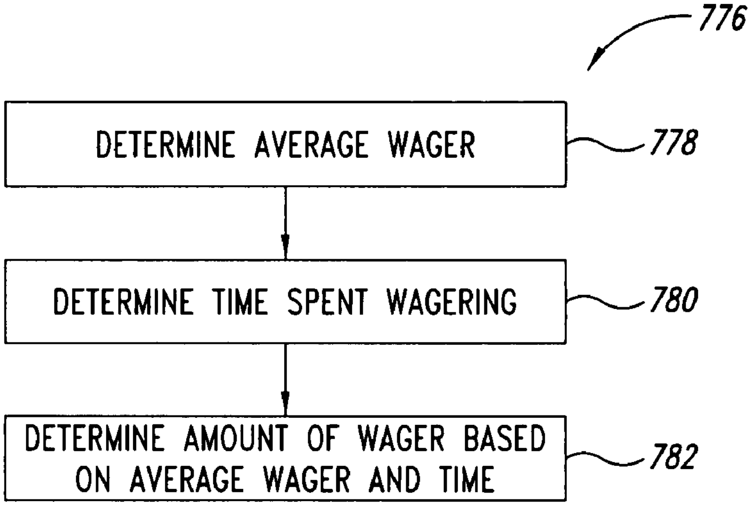
FIG. 13 is a flow diagram of a method of operating gaming system environment to determine a value for a player, according to another illustrated embodiment.

FIG. 13 shows a method 776 of determining a value for a player 110, according to another illustrated embodiment.

At 778, the host computing system 124 determines an average wager by the player 110. The host computing system 124 may determine the average wager based on one or more signals indicative of a manual observation or automatic detection and data collection of the wagering. Such has been previously discussed in detail with reference to FIG. 12 and is not repeated in the interest of brevity.

At 780, the host computing system 124 determines an actual or approximate amount of time spent wagering by the player 110. The host computing system 124 may determine the time spent wagering based on one or more signals from various components of the gaming system environment 400, for example, the participant interface 402, other gaming systems 404, and/or card handling system 120. For example, the host computing system 124 may rely on signals from a participant interface 404 which may include a reader 469 (FIG. 5) for reading player identification media 471 such as a player club card. Alternatively, the host computing system 124 may determine the time spent wagering based on one or more signals indicative of a manual observations of the player 110 by the dealer 114 or other casino personnel.

At 782, the host computing system 124 determines an approximate amount wagered based on the average wager and time spent wagering. For example, the host computing system 124 may multiply the average wager by the time spent wagering for the player 110.

Figure 14:
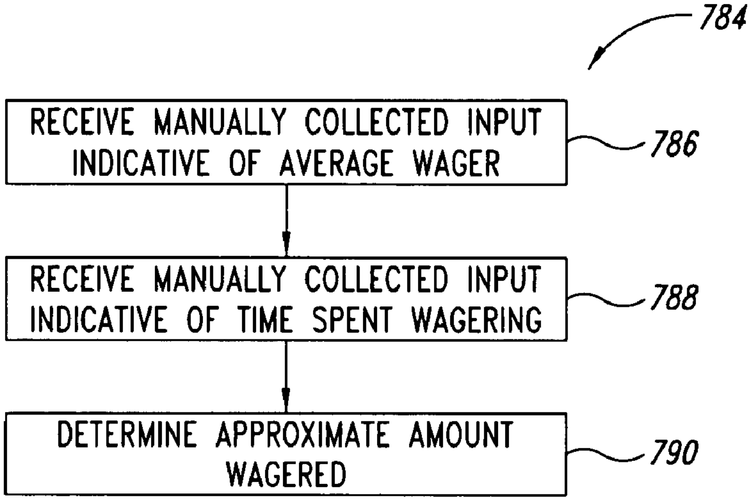
FIG. 14 is a flow diagram of a method of operating a gaming system environment to determine an amount wagered by a player, according to one illustrated embodiment.

FIG. 14 shows a method 784 of operating the gaming system environment 400 to determine an amount wagered by a player, according to a further illustrated embodiment. The method 784 may be suitable for use in the method 776 (FIG. 13).

At 786, the host computing system 124 receives manually collected input indicative of an average wager by a player 110. The input may be collected by the dealer 114 and/or or pit boss (not shown). As discussed above, the input may be collected on paper or other media, or may be entered or keyed into an electronic device, for example a handheld wireless communications device.

At 788, the host computing system 124 receives manually collected input indicative of time spent wagering by the player 110. Again, the input may be collected by the dealer 114 and/or pit boss. As noted above, the input may be collected on paper, other media or entered or keyed into an electronic device such as a handheld wireless communications device.

At 790, the host computing system 124 determines the approximate amount wagered by the player 110 based on the received manually collected input. For example, the host computing system 124 may multiply the average wager amount by the approximate time spent wagering.

Figure 15:
FIG. 15 is a flow diagram of a method of operating a gaming system environment to determine a value for a player, according to yet another illustrated embodiment.

FIG. 15 shows a method 792 of determining a value for a player N 110, according to yet another illustrated embodiment.

At 794, the host computing system 124 determines a theoretical advantage for the player 110. The theoretical advantage may represent or be indicative of a skill level of the player 110. For example, the theoretical advantage may represent how closely the player comes to a theoretical advantage for the particular game. For example, how closely a player 110 comes to playing basic strategy perfectly.

The host computing system 124 may determine the theoretical advantage based on one or more signals received from one or more components of the gaming system environment 400. For example, the host computing system 124 may determine the theoretical advantage based on one or more signals from the participant interface 402, other gaming systems 404, and/or card handling system 120.

The values for a player 110 determined via the various methods 772 (FIG. 12), 776 (FIG. 13), 784 (FIG. 14), 792 (FIG. 15) discussed above, or combination of such methods, allow the gamer operator, casino, or property owner to at least approximately determine an amount of profit that may be derived from the play of the respective player 110. This may allow the game operator, casino, or property owner to adjust an incentive in the form of chances or opportunities for a bonus that is provided to the player 110 accordingly. For example, the host computing system 124 can be configured to provide additional chances for winning a bonus to players 110 meeting certain criteria. For example, players that are predicted to lose larger sums while playing may be provided additional chances with respect to players predicted to lose relatively smaller sums. Such may be in response to a player wagering a higher amount than an average or defined amount, playing for longer periods than a define period or an average player, or having a lower theoretical advantage or skill level than a define level or that of average players. This may be particularly introducing new or low skill players to a game, by increasing their probability of winning and thereby allowing them an opportunity to learn how to play a particular game.

Figure 16:
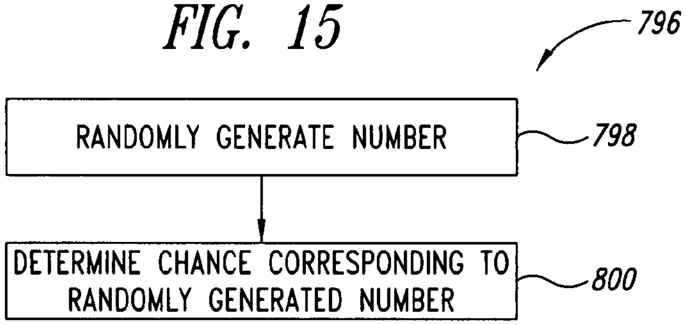
FIG. 16 is a flow diagram of a method of operating a gaming system environment to determine one or more winners of a bonus, according to one illustrated embodiment.

FIG. 16 shows a method 796 of determining one or more winners of a bonus, according to one illustrated embodiment.

At 798, the host computing system 124 randomly generates a value. At 800, the host computing system 124 determines or selects a chance corresponding to the randomly generated value. The player associated with the determined or selected chance, if any, wins part or all of the bonus.

Figure 17:
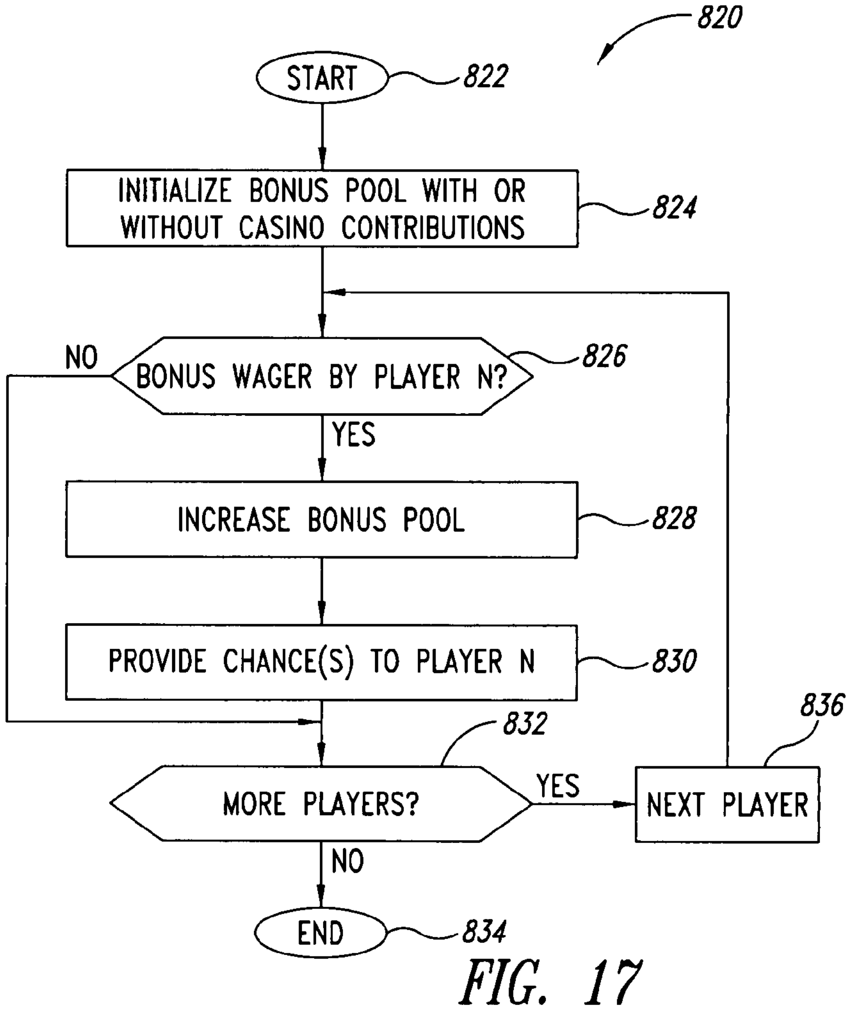
FIG. 17 is a flow diagram of a method of operating a gaming system environment to create a bonus pool, according to one illustrated embodiment.

FIG. 17 shows a method 820 operating a gaming system environment to create a bonus pool, according to one illustrated embodiment.

The method 820 starts at 822. For example, the method 822 may start in response to one or more signals indicative of the start of a game or round. The method 820 may start in response to the occurrence of a periodic time or event. Alternatively, or additionally, the method 820 may start in response to the award or determination of a previous bonus.

At 824, the host computing system 124 initializes the bonus pool with, or without, casino contributions. Thus, for example, the bonus pool may be initialized to zero where there are no casino or game operator contributions. Alternatively, the bonus pool may be initialized to some value that represents contributions by one or more game operators, casinos, or properties 304.

At 826, the host computing system 124 determines whether there has been a wager 112, 113 (FIGS. 1 and 2) placed by a player 110. In some embodiments, a bonus wager 113 is required to be eligible for an opportunity to win the bonus. In other embodiments, each conventional wager 112 on the outcome of the game, may entitle a player to an opportunity to win the bonus.

If there has been a wager 112, 113 placed, the host computing system 124 increases the bonus pool by an appropriate amount at 828. The amount may, for example, be a fixed amount or a percentage of the wager 112, 113. In some embodiments, the entire bonus wager 113 may be placed into the bonus pool. In other embodiments, a portion of the bonus wager 113 may be placed in the bonus pool. In other embodiments, a portion of the conventional wager 112 may be placed in the bonus pool. The bonus pool may include contributions from a single gaming table 102, more than one gaming tables 102, a single pit 300, multiple pits 300, a single property 304 or multiple properties 304. The bonus pool may additionally, or alternatively, include contributions from one or more game operators, casinos or property owners.

The bonus pool may take the form of money or equivalent (e.g., chips) prizes. The bonus pool may additionally, or alternatively include goods and/or services. For example, the bonus pool may include automobiles, recreational equipment, vacation packages, and/or services such as meals, shows, drinks, etc., which may be available on the property or off the property.

At 830, the host computing system 124 provides or otherwise allocates one or more chances to win the bonus to the player 110 placing the bonus wager 113. In some embodiments, each chance has an equal probability of winning the bonus as each of the other chances.

If a bonus wager has not been placed by the player 110, control passes to 832.

At 832, the host computing system 124 determines whether there are more players 110 in the game. If there are no more players 110 in the game, the method 820 terminates at 834. If there are more players 110 in the game, control passes to 836 to process a next player 110. Control then returns to 826.

The method 820 may repeat as a continuous process or thread. Alternatively the method 820 may terminate, and repeat only in response to a signal or occurrence of a defined event.

Figure 18:
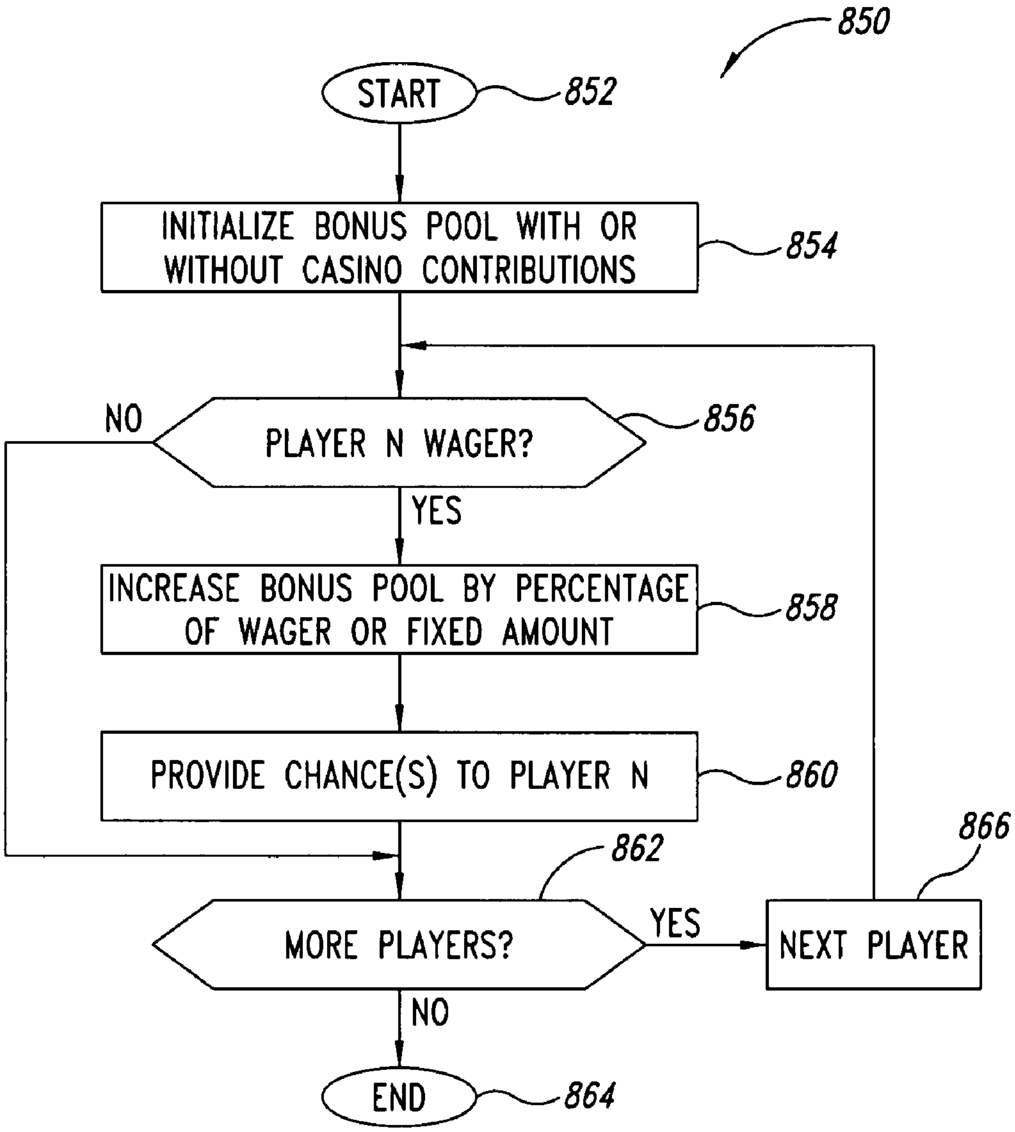
FIG. 18 is a flow diagram of a method of operating a gaming system environment to create a bonus pool, according to another illustrated embodiment.

FIG. 18 shows a method 850 of operating the gaming system environment 400 to create a bonus pool, according to another illustrated embodiment.

The method 850 starts at 852. For example, the method 850 may start in response to one or more signals indicative of the start of a game or round of the game. Alternatively, the method 850 may start in response to the occurrence of a time or periodic event. Additionally, or alternatively, the method 850 may start in response to the award or determination of a previous bonus.

At 854, the host computing system 124 initializes the bonus pool with, or without, casino contributions. Thus, for example, the bonus pool may be initialized to zero where there are no casino or game operator contributions. Alternatively, the bonus pool may be initialized to some value that represents contributions by one or more game operators, casinos, or properties 304.

At 856, the host computing system 124 determines whether a player 110 has placed a wager 112, 113. As noted above, in some embodiments, a bonus wager 113 is required to be eligible for an opportunity to win the bonus. Also as noted above, in other embodiments, each conventional wager 112 on the outcome of the game, may entitle a player to an opportunity to win the bonus.

If the player 110 has placed a wager, the host computing system 124 increases the bonus pool by an appropriate amount at 858. The amount may, for example, be a fixed amount or a percentage of the wager 112, 113. In some embodiments, the entire bonus wager 113 may be placed into the bonus pool. In other embodiments, a portion of the bonus wager 113 may be placed in the bonus pool. In other embodiments, a portion of the conventional wager 112 may be placed in the bonus pool. The bonus pool may include contributions from a single gaming table 102, more than one gaming tables 102, a single pit 300, multiple pits 300, a single property 304 or multiple properties 304. The bonus pool may additionally, or alternatively, include contributions from one or more game operators, casinos or property owners.

As noted above the bonus pool may take the form of money or equivalent (e.g., chips) prizes. Also as noted above, the bonus pool may additionally, or alternatively include goods and/or services. For example, the bonus pool may include automobiles, recreational equipment, vacation packages, and/or services such as meals, shows, drinks, etc., which may be available on the property or off the property.

At 860, the host computing system 124 provides one or more chances to the player 110 placing the wager. Control then passes to 862. If the player N has not placed a wager at 856, control passes directly to 862.

At 862, the host computing system 124 determines whether there are more players 110. If there are not more players, the method 850 terminates at 864. If there are more players, the host computing system 124 processes the next player at 866, returning control to 856.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the teachings, as will be recognized by those skilled in the relevant art. The teachings provided herein can be applied to other playing card distributing systems, not necessarily the exemplary playing card handling systems generally described above.

For example, in some embodiments, the playing cards used are standard playing cards from one or more standard decks of fifty-two (52) playing cards. The standard playing cards have a uniform back and the faces each bear a respective combination of a first primary symbol and a second primary symbol. The first primary symbol is selected from a standard set of playing card rank symbols comprising: 2, 3, 4, 5, 6, 7, 8, 9, 10, J, Q, K, and A; and the second primary symbol is selected from a standard set of playing card suit symbols comprising: ♡, ♧, ◇ ,and ♤.. One or more of the primary symbols may identify a value of the playing card under the rules of a specific card game. For example, in blackjack or twenty-one the ranks 2-10 are worth 2-10 points respectively, the ranks J-K are each worth 10 points, and the rank A is worth 10 or 1 point at the player's option. In other embodiments, the playing cards may have other symbols, graphics, backings, etc., and may even be modified within the playing card handling system 120 to add, enhance, or alter the value or significance of the playing card. In one embodiment, the playing cards are dual sided playing cards as described in U.S. patent application Ser. No. 10/902,436, which published on Jun. 2, 2005.

Some of the methods discussed above employ the generation of random numbers or values and some of the structures discussed above refer to random number generators (RNGs). While referred to herein and in the claims as being a random number or value and/or RNG, such terms encompass numbers and values as well as generators that are not truly random in the mathematical sense, such as those sometimes referred to as being pseudo-random. In some embodiments, the random number generator may take the form of a discrete analog or digital component. In other embodiments the RNG may take the form of a controller such as a microcontroller, microprocessor, digital signal processor, application specific integrated circuit or field programmable gate array executing suitable instructions to provide an RNG function.

In some embodiments, the RNG randomly determines or selects one or more chances from a domain of chances. In some embodiments, the domain may be fixed, while other embodiments may vary the domain. For example, the domain may be varied to match the number of chances provided to the players, or to adjust a probability of winning or payout. In some embodiments, parameters for a RNG function may be selected or varied to achieve a desired set of odds or payout. In some embodiments, the particular RNG function may be selected to achieve the a desired set of odds or payout.

The chances may take a variety of forms. The chances may take the form virtual chances in the form of electronic or other data that represent or are otherwise indicative of a value (e.g., integer or serial number) or identity (e.g., alpha-numeric string). The virtual chances may be provided or allocated to a player from a domain of virtual chances. Provision or allocation may take place in a computer-readable memory or other storage element, for example as relationships in a database or other data structure. The domain of virtual chances may be fixed or generated on the fly.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. Nos. 60/130,368, filed Apr. 21, 1999; 60/259,658, filed Jan. 4, 2001; 60/296,866, filed Jun. 8, 2001; 60/300,253, filed Jun. 21, 2001; 60/716,538, filed Sep. 12, 2005; 60/791,549, filed Apr. 12, 2006; 60/791,554, filed Apr. 12, 2006; 60/791,398, filed Apr. 12, 2006; 60/791,513, filed Apr. 12, 2006; and 60/808,161, filed May 23, 2006; and U.S. nonprovisional patent application Ser. No. 09/474,858, filed Dec. 30, 1999, and issued as U.S. Pat. No. 6,460,848 on Oct. 8, 2002; Ser. No. 09/849,456, filed May 4, 2001, and issued as U.S. Pat. No. 6,652,379 on Nov. 25, 2003; Ser. No. 09/790,480, filed Feb. 21, 2001, and issued as U.S. Pat. No. 6,685,568 on Feb. 3, 2004; Ser. No. 10/017,276, filed Dec. 13, 2001; Ser. No. 10/885,875, filed Jul. 7, 2004; Ser. No. 10/902,436, filed Jul. 29, 2004; Ser. No. 10/981,132, filed Nov. 3, 2004; Ser. No. 10/934,785, filed Sep. 2, 2004; and Ser. No. 10/823,051, filed Apr. 13, 2004, filed are incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A system to enhance table gaming, the system comprising:

means for determining a respective value for each of a plurality of players playing at one or more gaming tables, the values indicative of at least an approximation of at least an amount wagered by the respective player, and wherein the means for determining a respective value determines the values based at least in part on a respective skill level of each player;

means for indicating a number of chances available for winning a bonus relative to a total possible number of chances for each of at least some of the plurality of players, the number of chances available for each player based at least in part on the respective value; and means for determining at least one winner of the bonus from the chances, including:

means for determining a time remaining to qualify for the bonus, and means for notifying the players of the time remaining to qualify for the bonus, wherein each of the chances of the number of chances provided to each of the at least some of the plurality of players has a same probability of winning the bonus as each of the other chances.

2. The system of claim 1 wherein the means for determining a respective value determines the respective values based at least in part on a time spent by each of the players at the gaming table and an average amount wagered by each of the players during the respective time.

3. The system of claim 1 wherein the means for determining a respective value includes a reader operable to read player identity media.

4. The system of claim 1 wherein the means for determining a respective value includes a playing card reader operable to read information from playing cards used in a card game played at the gaming table.

5. The system of claim 1 wherein the means for determining a respective value includes a wager recognition system operable to read information from a number of chips placed at wagers in a game played at the gaming table.

6. The system of claim 1 wherein the means for determining a respective value includes a chip tray contents reader operable to read information from a number of chips in a chip tray at the gaming table.

7. The system of claim 1 wherein the means for determining a respective value includes a computing system executing a value determining set of instructions.

8. The system of claim 1 wherein the means for providing a number of chances at a bonus includes a database that stores count values, each of the count values indicative of the number of chances provided to the respective player.

9. The system of claim 1 wherein the means for determining a respective value includes a computing system executing a chance providing set of instructions.

10. The system of claim 1, further comprising:

means for notifying the players of an amount of the bonus.

11. The system of claim 1, further comprising:

means for notifying at least one of the players of information indicative of the chances of the at least one of the players.

12. The system of claim 10 wherein the means for notifying includes a computing system executing a notification providing set of instructions.

13. A computer-implemented method of enhancing table gaming, the method comprising:

under control of one or more computer systems configured with executable instructions, for each of a plurality of players, determining at least approximately an amount of time spent by the player at a gaming table;

for each of a plurality of players, determining at least approximately a respective skill level of a player;

for each of at least some of the plurality of players, indicating a number of chances available for winning a bonus relative to a total possible number of chances, the number of chances based at least in part on the amount of time spent by the player at the gaming table and the determined at least approximately respective skill level of the player, each of the chances of the number of chances provided to each of the at least some of the plurality of players having a same probability of winning the bonus as each of the other chances; and notifying each player of a time remaining to qualify for the bonus; and from time-to-time, determining at least one winner of the bonus from the chances.

14. The computer-implemented method of claim 13 wherein determining at least approximately an amount of time spent by the player at a gaming table includes automatically determining at least approximately the amount of time spent by the player at the gaming table.

15. The computer-implemented method of claim 13 wherein determining at least approximately an amount of time spent by the player at a gaming table includes determining at least approximately the amount of time spent by the player at a gaming table based at least in part on manual observations.

16. The computer-implemented method of claim 13 wherein providing a number of chances at a bonus is based at least in part on at least an approximation of an amount wagered by the respective player.

17. The computer-implemented method of claim 13 wherein providing a number of chances at a bonus is based at least in part on at least an approximation of an average amount wagered by the respective player.

18. The computer-implemented method of claim 13, wherein providing a number of chances at a bonus is based at least in part on a respective theoretical advantage of the player representative of a skill level of the respective player.

19. The computer-implemented method of claim 18, further comprising:

determining at least approximately the respective theoretical advantage of the player representative of a skill level of the respective player.

20. The computer-implemented method of claim 19 wherein determining at least approximately a respective theoretical advantage of the player representative of a skill level of the respective player includes manually observing play by the player at the gaming table.

21. The computer-implemented method of claim 19 wherein determining at least approximately a respective theoretical advantage of the player representative of a skill level of the respective player includes automatically tracking play by the player at the gaming table.

22. The computer-implemented method of claim 13 wherein the number of chances at a bonus is provided from a fixed set of chances.

23. The computer-implemented method of claim 13 wherein the number of chances at a bonus is provided automatically.

24. The computer-implemented method of claim 13 wherein determining at least one winner of the bonus from the chances occurs periodically.

25. The computer-implemented method of claim 13 wherein determining at least one winner of the bonus from the chances occurs when a bonus pool reaches a determined value.

26. The computer-implemented method of claim 13 wherein determining at least one winner of the bonus from the chances occurs when a bonus pool reaches a determined value or periodically if the bonus pool does not reach the determined value before an end of a period.

27. The computer-implemented method of claim 13 wherein determining at least one winner of the bonus from the chances includes randomly selecting at least one of the chances.

28. The computer-implemented method of claim 13 wherein determining at least one winner of the bonus from the chances includes automatically selecting at least one of the chances.

29. The computer-implemented method of claim 13, further comprising:

displaying an amount of time to the players, the amount of time indicative of when the bonus will be determined.

30. The computer-implemented method of claim 13, further comprising:

providing a notification to the players, the notification indicative of an amount of time when the providing of chances for the bonus will be curtailed.

31. The computer-implemented method of claim 30 wherein providing a notification to the players includes displaying an amount of time to the players, the amount of time indicative of when the providing of chances for the bonus will be curtailed.

32. The computer-implemented method of claim 31 wherein displaying an amount of time to the players includes displaying a count down clock.

33. The computer-implemented method of claim 31 wherein displaying an amount of time to the players includes displaying a count up clock.

34. The computer-implemented method of claim 13, further comprising:

displaying a value to at least some of the players indicative of a number of chances that have currently been provided to at least one of the players.

35. The computer-implemented method of claim 13, further comprising:

for each of the players, displaying a value to the respective player indicative of a number of chances that have currently been provided to the respective player.

36. The computer-implemented method of claim 13, further comprising:

forming a bonus pool from a portion of each of a number of wagers placed by one or more of the players on an outcome of a game being played by the player at the gaming table.

37. The computer-implemented method of claim 13, further comprising:

forming a bonus pool from a portion of each of a number of wagers placed by one or more of the players on an outcome of each of a plurality of games being played by the players at a plurality of gaming tables on a casino premises.

38. The computer-implemented method of claim 13, further comprising:

forming a bonus pool from a portion of each of a number of wagers placed by one or more of the players on an outcome of each of a plurality of games being played by the players at a plurality of gaming tables located at a plurality of premises.

39. The computer-implemented method of claim 13, further comprising:

forming a bonus pool from an additional wager placed by one or more of the players in addition a primary wager placed on an outcome of a game being played by the player at the gaming table.

40. The computer-implemented method of claim 13, further comprising:

forming a bonus pool from an additional wager placed by one or more of the players in addition a primary wager placed on an outcome of each of a plurality of games being played by the players at a plurality of gaming tables on a casino premises.

41. The computer-implemented method of claim 13, further comprising:

forming a bonus pool from an additional wager placed by one or more of the players in addition a primary wager placed on an outcome of each of a plurality of games being played by the players at a plurality of gaming tables located at a plurality of premises.

42. The computer-implemented method of claim 13, further comprising:

forming a bonus pool from a contribution provided by at least one casino.

43. The computer-implemented method of claim 13, further comprising:

providing a notification to the players, the notification indicative of an amount of a bonus pool.

44. The computer-implemented method of claim 13, further comprising:

updating the notification indicative of the amount of the bonus pool, from time-to-time.

45. A computer-implemented method of enhancing table gaming, the method comprising:

under control of one or more computer systems configured with executable instructions, for each of a plurality of players, determining at least approximately an amount of wagered by the player at a gaming table;

for each of a plurality of players, determining at least approximately a respective skill level of a player;

for each of at least some of the plurality of players, indicating a number of chances available for winning a bonus relative to a total possible number of chances, the number of chances based at least in part on the amount wagered by the player at the gaming table and the determined at least approximately respective skill level of the player, each of the chances of the number of chances provided to each of the at least some of the plurality of players having a same probability of winning the bonus as each of the other chances; and notifying each player of a time remaining to qualify for the bonus; and from time-to-time, determining at least one winner of the bonus from the chances.

46. The computer-implemented method of claim 45 wherein determining at least approximately an amount of wagered by the player at a gaming table includes determining at least approximately an amount of time spent wagering by the player at the gaming table.

47. The computer-implemented method of claim 46 wherein determining at least approximately an amount of wagered by the player at a gaming table further includes determining at least approximately an average amount wagered by the respective players.

48. The computer-implemented method of claim 47 wherein at least one of the determining at least approximately an amount of time spent by the player at a gaming table or determining at least approximately an average amount wagered by the respective players includes manually observing play at the gaming table.

49. The computer-implemented method of claim 47 wherein at least one of the determining at least approximately an amount of time spent by the player at a gaming table or determining at least approximately an average amount wagered by the respective players includes automatically tracking play at the gaming table.

50. The computer-implemented method of claim 45 wherein providing a number of chances at a bonus is based at least in part on a respective theoretical advantage of the player representative of a skill level of the respective player.

51. The computer-implemented method of claim 45, further comprising:

determining at least approximately the respective theoretical advantage of the player representative of a skill level of the respective player.

52. The computer-implemented method of claim 51 wherein determining at least approximately a respective theoretical advantage of the player representative of a skill level of the respective player includes manually observing play by the player at the gaming table.

53. The computer-implemented method of claim 51 wherein determining at least approximately a respective theoretical advantage of the player representative of a skill level of the respective player includes automatically tracking play by the player at the gaming table.

54. The computer-implemented method of claim 45 wherein the number of chances at a bonus is provided from a fixed set of chances.

55. The computer-implemented method of claim 45 wherein the number of chances at a bonus is provided automatically.

56. The computer-implemented method of claim 45 wherein determining at least one winner of the bonus from the chances occurs periodically.

57. The computer-implemented method of claim 45 wherein determining at least one winner of the bonus from the chances occurs when a bonus pool reaches a determined value.

58. The computer-implemented method of claim 45 wherein determining at least one winner of the bonus from the chances occurs when a bonus pool reaches a determined value or periodically if the bonus pool does not reach the determined value before an end of a period.

59. The computer-implemented method of claim 45 wherein determining at least one winner of the bonus from the chances includes randomly selecting at least one of the chances.

60. The computer-implemented method of claim 45 wherein determining at least one winner of the bonus from the chances includes automatically selecting at least one of the chances.

61. The computer-implemented method of claim 45, further comprising:

displaying an amount of time to the players, the amount of time indicative of when the bonus will be determined.

62. The computer-implemented method of claim 45, further comprising:

providing a notification to the players, the notification indicative of an amount of time when the providing of chances for the bonus will be curtailed.

63. The computer-implemented method of claim 62 wherein providing a notification to the players includes displaying an amount of time to the players, the amount of time indicative of when the providing of chances for the bonus will be curtailed.

64. The computer-implemented method of claim 63 wherein displaying an amount of time to the players includes displaying a count down clock.

65. The computer-implemented method of claim 63 wherein displaying an amount of time to the players includes displaying a count up clock.

66. The computer-implemented method of claim 45, further comprising:

displaying a value to at least some of the players indicative of a number of chances that have currently been provided to at least one of the players.

67. The computer-implemented method of claim 45, further comprising:

for each of the players, displaying a value to the respective player indicative of a number of chances that have currently been provided to the respective player.

68. The computer-implemented method of claim 45, further comprising:

forming a bonus pool from a portion of each of a number of wagers placed by one or more of the players on an outcome of a game being played by the player at the gaming table.

69. The computer-implemented method of claim 45, further comprising:

forming a bonus pool from a portion of each of a number of wagers placed by one or more of the players on an outcome of each of a plurality of games being played by the players at a plurality of gaming tables on a casino premises.

70. The computer-implemented method of claim —5, further comprising:

forming a bonus pool from a portion of each of a number of wagers placed by one or more of the players on an outcome of each of a plurality of games being played by the players at a plurality of gaming tables located at a plurality of premises.

71. The computer-implemented method of claim 45, further comprising:

forming a bonus pool from an additional wager placed by one or more of the players in addition a primary wager placed on an outcome of a game being played by the player at the gaming table.

72. The computer-implemented method of claim 45, further comprising:

forming a bonus pool from an additional wager placed by one or more of the players in addition a primary wager placed on an outcome of each of a plurality of games being played by the players at a plurality of gaming tables on a casino premises.

73. The computer-implemented method of claim 45, further comprising:

forming a bonus pool from an additional wager placed by one or more of the players in addition a primary wager placed on an outcome of each of a plurality of games being played by the players at a plurality of gaming tables located at a plurality of premises.

74. The computer-implemented method of claim 45, further comprising:

forming a bonus pool from a contribution provided by at least one casino.

75. The computer-implemented method of claim 45, further comprising:

providing a notification to the players, the notification indicative of an amount of a bonus pool.

76. The computer-implemented method of claim 45, further comprising:

updating the notification indicative of the amount of the bonus pool, from time-to-time.

77. A computer-implemented method of enhancing table gaming, the method comprising:

under control of one or more computer systems configured with executable instructions, for each of a plurality of players, determining at least approximately an average amount wagered by the player at a gaming table and at least approximately an amount of time spent wagering by the player at the gaming table;

for each of a plurality of players, determining at least approximately a respective skill level of a player;

for each of at least some of the plurality of players, indicating a number of chances available for winning a bonus relative to a total possible number of chances, the number of chances based at least in part on the amount wagered and time spent wagering by the player at the gaming table and the determined at least approximately respective skill level of the player, each of the chances of the number of chances provided to each of the at least some of the plurality of players having a same probability of winning the bonus as each of the other chances; and notifying each player of a time remaining to qualify for the bonus; and from time-to-time, determining at least one winner of the bonus from the chances.

78. The computer-implemented method of claim 77 wherein at least one of the determining at least approximately an amount of time spent by the player at a gaming table or determining at least approximately an average amount wagered by the respective players includes manually observing play at the gaming table.

79. The computer-implemented method of claim 77 wherein at least one of the determining at least approximately an amount of time spent by the player at a gaming table or determining at least approximately an average amount wagered by the respective players includes automatically tracking play at the gaming table.

80. The computer-implemented method of claim 77 wherein providing a number of chances at a bonus is based at least in part on a respective theoretical advantage of the player representative of a skill level of the respective player.

81. The computer-implemented method of claim 77, further comprising:

determining at least approximately the respective theoretical advantage of the player representative of a skill level of the respective player.

82. The computer-implemented method of claim 77 wherein determining at least approximately a respective theoretical advantage of the player representative of a skill level of the respective player includes manually observing play by the player at the gaming table.

83. The computer-implemented method of claim 77 wherein determining at least approximately a respective theoretical advantage of the player representative of a skill level of the respective player includes automatically tracking play by the player at the gaming table.

84. The computer-implemented method of claim 77 wherein the number of chances at a bonus is provided from a fixed set of chances.

85. The computer-implemented method of claim 77 wherein the number of chances at a bonus is provided automatically.

86. The computer-implemented method of claim 77 wherein determining at least one winner of the bonus from the chances occurs periodically.

87. The computer-implemented method of claim 77 wherein determining at least one winner of the bonus from the chances occurs when a bonus pool reaches a determined value.

88. The computer-implemented method of claim 77 wherein determining at least one winner of the bonus from the chances occurs when a bonus pool reaches a determined value or periodically if the bonus pool does not reach the determined value before an end of a period.

89. The computer-implemented method of claim 77 wherein determining at least one winner of the bonus from the chances includes randomly selecting at least one of the chances.

90. The computer-implemented method of claim 77 wherein determining at least one winner of the bonus from the chances includes automatically selecting at least one of the chances.

91. The computer-implemented method of claim 77, further comprising:

displaying an amount of time to the players, the amount of time indicative of when the bonus will be determined.

92. The computer-implemented method of claim 77, further comprising:

providing a notification to the players, the notification indicative of an amount of time when the providing of chances for the bonus will be curtailed.

93. The computer-implemented method of claim 92 wherein providing a notification to the players includes displaying an amount of time to the players, the amount of time indicative of when the providing of chances for the bonus will be curtailed.

94. The computer-implemented method of claim 93 wherein displaying an amount of time to the players includes displaying a count down clock.

95. The computer-implemented method of claim 93 wherein displaying an amount of time to the players includes displaying a count up clock.

96. The computer-implemented method of claim 77, further comprising:

displaying a value to at least some of the players indicative of a number of chances that have currently been provided to at least one of the players.

97. The computer-implemented method of claim 77, further comprising:

for each of the players, displaying a value to the respective player indicative of a number of chances that have currently been provided to the respective player.

98. The computer-implemented method of claim 77, further comprising:

forming a bonus pool from a portion of each of a number of wagers placed by one or more of the players on an outcome of a game being played by the player at the gaming table.

99. The computer-implemented method of claim 77, further comprising:

forming a bonus pool from a portion of each of a number of wagers placed by one or more of the players on an outcome of each of a plurality of games being played by the players at a plurality of gaming tables on a casino premises.

100. The computer-implemented method of claim 77, further comprising:

forming a bonus pool from a portion of each of a number of wagers placed by one or more of the players on an outcome of each of a plurality of games being played by the players at a plurality of gaming tables located at a plurality of premises.

101. The computer-implemented method of claim 77, further comprising:

forming a bonus pool from an additional wager placed by one or more of the players in addition a primary wager placed on an outcome of a game being played by the player at the gaming table.

102. The computer-implemented method of claim 77, further comprising:

forming a bonus pool from an additional wager placed by one or more of the players in addition a primary wager placed on an outcome of each of a plurality of games being played by the players at a plurality of gaming tables on a casino premises.

103. The computer-implemented method of claim 77, further comprising:

forming a bonus pool from an additional wager placed by one or more of the players in addition a primary wager placed on an outcome of each of a plurality of games being played by the players at a plurality of gaming tables located at a plurality of premises.

104. The computer-implemented method of claim 77, further comprising:

forming a bonus pool from a contribution provided by at least one casino.

105. The computer-implemented method of claim 77, further comprising:

providing a notification to the players, the notification indicative of an amount of a bonus pool.

106. The computer-implemented method of claim 77, further comprising:

updating the notification indicative of the amount of the bonus pool, from time-to-time.

107. A computer-implemented method of enhancing table gaming, the method comprising:

under control of one or more computer systems configured with executable instructions, for each of a plurality of players, determining at least approximately a respective skill level of a player;

for each of the plurality of players playing at a gaming table, determining at least approximately a respective theoretical advantage of the player representative of the determined respective skill level of the respective player;

for each of at least some of the plurality of players, providing a number of chances at a bonus, the number of chances based at least in part on the respective theoretical advantage of the player, each of the chances of the number of chances provided to each of the at least some of the plurality of players having a same probability of winning the bonus as each of the other chances; and notifying each player of a time remaining to qualify for the bonus; and from time-to-time, determining at least one winner of the bonus from the chances.

108. The computer-implemented method of claim 107 wherein determining at least approximately a respective theoretical advantage of the player representative of a skill level of the respective player includes manually observing play by the player at the gaming table.

109. The computer-implemented method of claim 107 wherein determining at least approximately a respective theoretical advantage of the player representative of a skill level of the respective player includes automatically tracking play by the player at the gaming table.

110. The computer-implemented method of claim 109 wherein automatically tracking play by the player at the gaming table includes automatically tracking wagers at the gaming table.

111. The computer-implemented method of claim 109 wherein automatically tracking play by the player at the gaming table includes automatically tracking game outcomes at the gaming table.

112. The computer-implemented method of claim 109 wherein automatically tracking play by the player at the gaming table includes automatically tracking decisions by the player.

113. The computer-implemented method of claim 109 wherein automatically tracking play by the player at the gaming table includes automatically tracking an amount won relative to an amount wagered by the player.

114. The computer-implemented method of claim 107 wherein the number of chances at a bonus is provided from a fixed set of chances.

115. The computer-implemented method of claim 107 wherein the number of chances at a bonus is provided automatically.

116. The computer-implemented method of claim 107 wherein determining at least one winner of the bonus from the chances occurs periodically.

117. The computer-implemented method of claim 107 wherein determining at least one winner of the bonus from the chances occurs when a bonus pool reaches a determined value.

118. The computer-implemented method of claim 107 wherein determining at least one winner of the bonus from the chances occurs when a bonus pool reaches a determined value or periodically if the bonus pool does not reach the determined value before an end of a period.

119. The computer-implemented method of claim 107 wherein determining at least one winner of the bonus from the chances includes randomly selecting at least one of the chances.

120. The computer-implemented method of claim 107 wherein determining at least one winner of the bonus from the chances includes automatically selecting at least one of the chances.

121. The computer-implemented method of claim 107, further comprising:

displaying an amount of time to the players, the amount of time indicative of when the bonus will be determined.

122. The computer-implemented method of claim 107, further comprising:

providing a notification to the players, the notification indicative of an amount of time when the providing of chances for the bonus will be curtailed.

123. The computer-implemented method of claim 122 wherein providing a notification to the players includes displaying an amount of time to the players, the amount of time indicative of when the providing of chances for the bonus will be curtailed.

124. The computer-implemented method of claim 123 wherein displaying an amount of time to the players includes displaying a count down clock.

125. The computer-implemented method of claim 123 wherein displaying an amount of time to the players includes displaying a count up clock.

126. The computer-implemented method of claim 107, further comprising:

displaying a value to at least some of the players indicative of a number of chances that have currently been provided to at least one of the players.

127. The computer-implemented method of claim 107, further comprising:

for each of the players, displaying a value to the respective player indicative of a number of chances that have currently been provided to the respective player.

128. The computer-implemented method of claim 107, further comprising:

forming a bonus pool from a portion of each of a number of wagers placed by one or more of the players on an outcome of a game being played by the player at the gaming table.

129. The computer-implemented method of claim 107, further comprising:

forming a bonus pool from a portion of each of a number of wagers placed by one or more of the players on an outcome of each of a plurality of games being played by the players at a plurality of gaming tables on a casino premises.

130. The computer-implemented method of claim 107, further comprising:

forming a bonus pool from a portion of each of a number of wagers placed by one or more of the players on an outcome of each of a plurality of games being played by the players at a plurality of gaming tables located at a plurality of premises.

131. The computer-implemented method of claim 107, further comprising:

forming a bonus pool from an additional wager placed by one or more of the players in addition a primary wager placed on an outcome of a game being played by the player at the gaming table.

132. The computer-implemented method of claim 107, further comprising:

forming a bonus pool from an additional wager placed by one or more of the players in addition a primary wager placed on an outcome of each of a plurality of games being played by the players at a plurality of gaming tables on a casino premises.

133. The computer-implemented method of claim 107, further comprising:

forming a bonus pool from an additional wager placed by one or more of the players in addition a primary wager placed on an outcome of each of a plurality of games being played by the players at a plurality of gaming tables located at a plurality of premises.

134. The computer-implemented method of claim 107, further comprising:

forming a bonus pool from a contribution provided by at least one casino.

135. The computer-implemented method of claim 107, further comprising:

providing a notification to the players, the notification indicative of an amount of a bonus pool.

136. The computer-implemented method of claim 107, further comprising:

updating the notification indicative of the amount of the bonus pool, from time-to-time.

137. A computer-implemented method of enhancing table gaming, the method comprising:

under control of one or more computer systems configured with executable instructions, for each of a plurality of players playing a table game at a gaming table, determining at least approximately a respective skill level of a player;

for each of the plurality of players playing the table game at the gaming table, indicating a number of chances available for winning a bonus relative to a total possible number of chances, based at least in part on determining at least approximately a respective theoretical advantage of the player that is representative of the determined respective skill level of the player, each of the chances having the same probability of being selected as a winner as each of the other chances, each of the chances having a same probability of winning the bonus as each of the other chances;

at a first time, displaying an indication of at least a first player's chances with respect to a bonus pool;

notifying each player of a time remaining to qualify for the bonus; and from time-to-time, determining at least one winner of the bonus based at least in part on the chances.

138. The computer-implemented method of claim 137 wherein for each of a plurality of players playing a table game at a gaming table, providing a number of chances at a bonus includes providing a number of chances based at least in part on an amount of time spent by the player at the gaming table.

139. The computer-implemented method of claim 137 wherein for each of a plurality of players playing a table game at a gaming table, providing a number of chances at a bonus includes providing a number of chances based at least in part on an approximation of an amount wagered by the respective player.

140. The computer-implemented method of claim 137 wherein for each of a plurality of players playing a table game at a gaming table, providing a number of chances at a bonus includes providing a number of chances based at least in part on an amount of time spent by the player at the gaming table and an approximation of an average amount wagered by the respective player.

141. The computer-implemented method of claim 137 wherein for each of a plurality of players playing a table game at a gaming table, providing a number of chances at a bonus includes providing a number of chances based at least in part on a respective theoretical advantage of the player representative of a skill level of the respective player.

142. The computer-implemented method of claim 137 wherein displaying an indication of at least a first player's chances with respect to a bonus pool includes displaying a respective indication of the chances for each of a plurality of players visible to all of the players.

143. The computer-implemented method of claim 137 wherein displaying an indication of at least a first player's chances with respect to a bonus pool includes displaying the a respective indication of the chances for each of a plurality of players visible only to the respective ones of the players.

144. The computer-implemented method of claim 137 wherein displaying an indication of at least a first player's chances with respect to a bonus pool includes displaying an indication via a user interface of a wireless communications device.

145. The computer-implemented method of claim 137 wherein displaying an indication of at least a first player's chances with respect to a bonus pool includes displaying the first player's chances in relation to a number of chances of at least one other player.

146. The computer-implemented method of claim 145 wherein displaying the first player's chances in relation to a number of chances of at least one other player includes displaying a graphical illustration of the first players chances positioned with respect to the chances of all other players.

147. The computer-implemented method of claim 137 wherein displaying an indication of at least a first player's chances with respect to a bonus pool includes displaying the first player's chances relative to an average chance.

148. The computer-implemented method of claim 137 wherein determining at least one winner of the bonus based at least in part on the chances includes randomly selecting at least one of the chances.

149. The computer-implemented method of claim 137 wherein displaying an indication of at least a first player's chances with respect to a bonus pool includes automatically selecting at least one of the chances.

150. The computer-implemented method of claim 137, further comprising:

displaying an amount of time to the players, the amount of time indicative of when the bonus will be determined.

151. The computer-implemented method of claim 137, further comprising:

providing a notification to the players, the notification indicative of an amount of time when the providing of chances for the bonus will be curtailed.

152. The computer-implemented method of claim 122, further comprising:

displaying an amount of time to the players, the amount of time indicative of when the providing of chances for the bonus will be curtailed.

153. The computer-implemented method of claim 152 wherein displaying an amount of time to the players includes displaying a count down clock.

154. The computer-implemented method of claim 152 wherein displaying an amount of time to the players includes displaying a count up clock.

155. The computer-implemented method of claim 137, further comprising:

forming a bonus pool from a portion of each of a number of wagers placed by one or more of the players on an outcome of a game being played by the player at the gaming table.

156. The computer-implemented method of claim 137, further comprising:

forming a bonus pool from a portion of each of a number of wagers placed by one or more of the players on an outcome of each of a plurality of games being played by the players at a plurality of gaming tables on a casino premises.

157. The computer-implemented method of claim 137, further comprising:

forming a bonus pool from a portion of each of a number of wagers placed by one or more of the players on an outcome of each of a plurality of games being played by the players at a plurality of gaming tables located at a plurality of premises.

158. The computer-implemented method of claim 137, further comprising:

forming a bonus pool from an additional wager placed by one or more of the players in addition a primary wager placed on an outcome of a game being played by the player at the gaming table.

159. The computer-implemented method of claim 137, further comprising:

forming a bonus pool from an additional wager placed by one or more of the players in addition a primary wager placed on an outcome of each of a plurality of games being played by the players at a plurality of gaming tables on a casino premises.

160. The computer-implemented method of claim 137, further comprising:

forming a bonus pool from an additional wager placed by one or more of the players in addition a primary wager placed on an outcome of each of a plurality of games being played by the players at a plurality of gaming tables located at a plurality of premises.

161. The computer-implemented method of claim 137, further comprising:

forming a bonus pool from a contribution provided by at least one casino.

162. The computer-implemented method of claim 137, further comprising:

providing a notification to the players, the notification indicative of an amount of a bonus pool.

* * * * *